US012117142B2

(12) United States Patent
Suttle et al.

(10) Patent No.: US 12,117,142 B2
(45) Date of Patent: Oct. 15, 2024

(54) ROTATABLE TRIMS FOR RECESSED LUMINAIRES

(71) Applicant: SIGNIFY HOLDING B.V., Eindhoven (NL)

(72) Inventors: Joshua Suttle, Atlanta, GA (US); Wei Zhao, Shanghai (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/573,494

(22) PCT Filed: Jun. 28, 2022

(86) PCT No.: PCT/EP2022/067653
§ 371 (c)(1),
(2) Date: Dec. 22, 2023

(87) PCT Pub. No.: WO2023/275001
PCT Pub. Date: Jan. 5, 2023

(65) Prior Publication Data

US 2024/0288133 A1 Aug. 29, 2024

Related U.S. Application Data

(60) Provisional application No. 63/217,328, filed on Jul. 1, 2021.

(30) Foreign Application Priority Data

Jul. 16, 2021 (EP) .................................... 21185985

(51) Int. Cl.
*F21S 8/02* (2006.01)
*F21V 17/00* (2006.01)
(Continued)

(52) U.S. Cl.
CPC ............ *F21S 8/026* (2013.01); *F21V 17/166* (2013.01); *F21V 17/18* (2013.01); *F21V 29/80* (2015.01); *F21V 17/005* (2013.01)

(58) Field of Classification Search
CPC ........ F21S 8/026; F21V 29/80; F21V 17/166; F21V 17/18; F21V 17/005
See application file for complete search history.

(56) References Cited

U.S. PATENT DOCUMENTS 10,041,654 B1 8/2018 Ernst et al.
10,760,750 B1 * 9/2020 Hsu ......................... F21V 21/04
(Continued)

FOREIGN PATENT DOCUMENTS

CN 209386038 U 9/2019
CN 210197127 U 3/2020
(Continued)

*Primary Examiner* — Anne M Hines

(57) ABSTRACT

A luminaire can include a securing assembly having a securing assembly flange and a plurality of securing assemblies disposed on the securing assembly flange, where each of the plurality of securing assemblies secures a collar of a heat sink assembly against the securing assembly flange in a fixed position. The luminaire can also include a trim assembly comprising a trim body having a trim flange fixedly disposed atop a trim side wall, wherein the trim flange is secured by the plurality of securing assemblies, wherein the trim assembly is rotatable while the trim flange and the collar are secured by the plurality of securing assemblies.

10 Claims, 18 Drawing Sheets

(51) Int. Cl.

| | |
|---|---|
| ***F21V 17/16*** | (2006.01) |
| ***F21V 17/18*** | (2006.01) |
| ***F21V 29/80*** | (2015.01) |

(56) References Cited

U.S. PATENT DOCUMENTS

| | | | | |
|---|---|---|---|---|
| 2017/0045209 | A1 | 2/2017 | Schubert et al. | |
| 2018/0224095 | A1 | 8/2018 | Cohen | |
| 2019/0360668 | A1 | 11/2019 | Ernst | |
| 2020/0072444 | A1 | 3/2020 | Bokros et al. | |
| 2020/0080706 | A1 | 3/2020 | Nobis et al. | |
| 2022/0349535 | A1* | 11/2022 | Sonneman .............. | F21S 8/026 |

FOREIGN PATENT DOCUMENTS

| | | | |
|---|---|---|---|
| WO | 2016031945 | A1 | 3/2016 |
| WO | 2018007291 | A1 | 1/2018 |

* cited by examiner

ROTATABLE TRIMS FOR RECESSED LUMINAIRES

CROSS-REFERENCE TO PRIOR APPLICATIONS

This application is the U.S. National Phase application under 35 U.S.C. § 371 of International Application No. PCT/EP2022/067653, filed on Jun. 28, 2022, which claims the benefit of U.S. Provisional Patent Application No. 63/217,328, filed on Jul. 1, 2021 and European Patent Application No. 21185985.5, filed on Jul. 16, 2021. These applications are hereby incorporated by reference herein.

TECHNICAL FIELD

The present disclosure relates generally to recessed luminaires, and more particularly to systems, methods, and devices for rotatable trims for recessed luminaires.

BACKGROUND

Recessed luminaires sometimes are designed to have specific wall wash patterns. Most wall washes today require the housing of a recessed luminaire to be installed in a specific location or orientation in order to direct the light to the intended wall. For example, recessed luminaires installed in the ceiling of a hallway and in the ceiling near a wall can benefit from having particular wall wash patterns. Sometimes, the installation instructions that accompany these types of recessed luminaires are not followed, causing the lighting to be directed to places that are unintended targets. Currently, the fix to a housing of a recessed luminaire with a wall wash pattern that is installed in the wrong orientation is to rip the ceiling and structure down and start again, which is very expensive.

SUMMARY

In general, in one aspect, the disclosure relates to a luminaire that includes a securing assembly comprising a securing assembly flange and a plurality of securing member assemblies disposed on the securing assembly flange, where each of the plurality of securing member assemblies secures a collar of a heat sink assembly against the securing assembly flange in a fixed position. The luminaire can also include a trim assembly comprising a trim body having a trim flange fixedly disposed atop a trim side wall, where the trim flange is secured by the plurality of securing member assemblies, where the trim assembly is rotatable while the trim flange and the collar are secured by the plurality of securing member assemblies.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
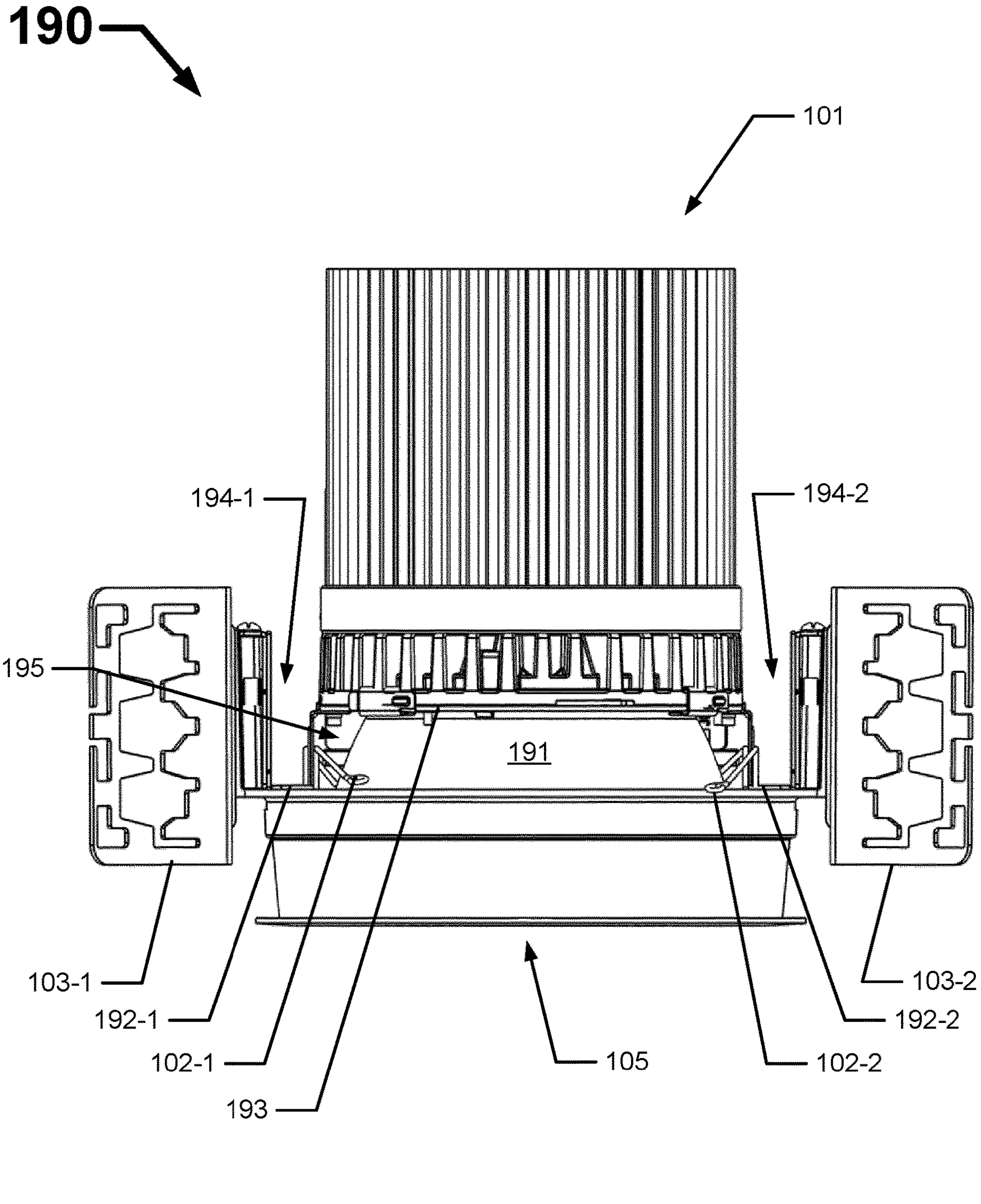
FIG. 1 (Prior Art)
FIG. 1 shows a side view of a recessed luminaire currently used in the art.

In general, example embodiments provide systems, methods, and devices for rotatable trims for luminaire. Example embodiments can provide a number of benefits. Such benefits can include, but are not limited to, avoidance of added costs (e.g., material damage and repair) for incorrect installation and flexible light dispersion. Example embodiments can be used with new recessed luminaires or retrofit with existing recessed luminaires. Luminaires can include light fixtures, lighting devices, lighting systems. A recessed luminaire has at least a portion of the luminaire hidden from view by a structure (e.g., a ceiling tile, drywall), while a remainder of the recessed luminaire is visible in a volume of space in which the recessed luminaire provides illumination.

Recessed luminaires with example rotatable trims can be located in one or more of any of a number of environments. Examples of such environments can include, but are not limited to, indoors, outdoors, a parking garage, a kitchen or cooking space, a hallway, an entertainment room, an office space, a manufacturing plant, a warehouse, and a storage facility, both climate-controlled and non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Recessed luminaires with example rotatable trims can be integrated into any of a number of different structures. Such structures can include, but are not limited to, a pole, an I-beam, a tree, a wall, and a building facade. A user may be any person that interacts with luminaires. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

Recessed luminaires with example rotatable trims (including components thereof) can be made of one or more of a number of suitable materials to allow the luminaire to meet certain standards and/or regulations while also maintaining durability in light of the one or more conditions under which the luminaires and/or other associated components of the luminaire can be exposed. Examples of such materials can include, but are not limited to, aluminum, stainless steel, fiberglass, glass, plastic, ceramic, and rubber.

Example rotatable trims, or portions thereof, described herein can be made from a single piece (as from a mold, injection mold, die cast, or extrusion process). In addition, or in the alternative, example rotatable trims can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example rotatable trim to become coupled, directly or indirectly, to a structure (e.g., a pole), a housing of a luminaire, and/or some other component of the rotatable trim. A coupling feature can include, but is not limited to, a clamp, a portion of a hinge, an aperture, a recessed area, a protrusion, a hole, a slot, a tab, a detent, and mating threads. One portion of an example rotatable trim can be coupled to a structure, a housing of a luminaire, a frame of a luminaire, and/or some other component of the rotatable trim by the direct use of one or more coupling features.

In addition, or in the alternative, a portion of an example rotatable trim can be coupled to a structure, a housing of a luminaire, a frame of a luminaire, and/or some other component of the rotatable trim using one or more independent devices that interact with one or more coupling features disposed on a component of the rotatable trim. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of rotatable trims for recessed luminaires, one or more of the components shown may be omitted, repeated, and/or substituted. Accordingly, example embodiments of rotatable trims for recessed luminaires should not be considered limited to the specific arrangements of components shown in any of the figures. For example, features shown in one or more figures or described with respect to one embodiment can be applied to another embodiment associated with a different figure or description.

In certain example embodiments, recessed luminaires having example rotatable trims are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the luminaire to meet) such standards when applicable.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit or a four-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of rotatable trims for recessed luminaires will be described more fully hereinafter with reference to the accompanying drawings, in which example embodiments of rotatable trims for recessed luminaires are shown. Rotatable trims for recessed luminaires may, however, be embodied in many different forms and should not be construed as limited to the example embodiments set forth herein. Rather, these example embodiments are provided so that this disclosure will be thorough and complete, and will fully convey the scope of rotatable trims for recessed luminaires to those of ordinary skill in the art. Like, but not necessarily the same, elements (also sometimes called components) in the various figures are denoted by like reference numerals for consistency.

Terms such as "first", "second", "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. Such terms are not meant to denote a preference or a particular orientation. Such terms are not meant to limit embodiments of rotatable trims for recessed luminaires. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a side view of a recessed luminaire 190 currently used in the art. The recessed luminaire 190 of FIG. 1 includes a frame 105, a trim assembly 195, a heat sink assembly 101, a pair of torsion spring receiver bracket assemblies 194 (torsion spring receiver bracket assembly 194-1 and torsion spring receiver bracket assembly 194-2), a pair of torsion springs 102 (torsion spring 102-1 and torsion spring 102-2), and a pair of mounting brackets 103 (mounting bracket 103-1 and mounting bracket 103-2).

The heat sink assembly 101 can serve multiple functions. For example, the heat sink assembly 101 can include an internal cavity inside of which can be housed one or more electrical components, including but not limited to a power supply (e.g., a driver) and a controller. As another example, the heat sink assembly 101 can include heat sinking material (e.g., thermally conductive metal) configured in such a way (e.g., multiple fins) to absorb heat generated by one or more heat-generating components (e.g., a driver) and dissipate the heat into the ambient environment.

Each of the torsion spring receiver bracket assemblies 194 includes a torsion spring receiver bracket 192. In this case, the torsion spring receiver bracket assembly 194-1 includes the torsion spring receiver bracket assembly 192-1, and the torsion spring receiver bracket assembly 194-2 includes the torsion spring receiver bracket assembly 192-2. Each torsion spring receiver bracket assembly 192 is configured to receive a torsion spring 102. In this case, the torsion spring receiver bracket assembly 192-1 receives the torsion spring 102-1, and the torsion spring receiver bracket assembly 192-2 receives the torsion spring 102-2. The torsion springs 102 are configured to help secure the recessed luminaire 190 within a recessed space (e.g., a plenum space).

Each mounting bracket 103 is mounted to an outer surface of a torsion spring receiver bracket assembly 194. For example, in this case, the mounting bracket 103-1 is mounted on the outer surface of the torsion spring receiver bracket assembly 194-1, and the mounting bracket 103-2 is mounted on the outer surface of the torsion spring receiver bracket assembly 194-2. The mounting brackets 103 are configured to help secure the recessed luminaire 190 within a recessed space. More details of the frame are provided below with respect to FIG. 5.

The trim assembly 195 has a trim body 191 and a trim flange 193 that is fixedly coupled to the top end of the trim body 191. The trim flange 193 of the trim assembly 195 is also fixedly coupled to the bottom end of the heat sink assembly 191. In other words, once the trim assembly 195 is coupled to the heat sink assembly 191, and once the recessed luminaire 190 is installed (e.g., in a plenum area above a ceiling), the trim assembly 191 (and more specifically the trim body 191) cannot be rotated. If the inner surface of the trim body 191 is configured to have a non-uniform wall wash distribution for the light emitted by the light sources of the recessed luminaire 190, and if the recessed luminaire 190 is not installed in the proper orientation (i.e., the wall wash distribution is not aligned properly), then the only way to correct for the proper wall wash distribution is to uninstall the entire recessed luminaire 190, reorient the recessed luminaire 190, and reinstall the recessed luminaire 190 in the proper orientation. This can be a destructive process in terms of the structure (e.g., cut away and patch drywall) and/or in terms of one or more components (e.g., strip a screw or other fastening device, bend a torsion spring 102) of the recessed luminaire 190. This process also expends extra time and labor. Being able to rotate the trim assembly when the luminaire is installed, as with example embodiments, avoids these issues.

Figure 2A:
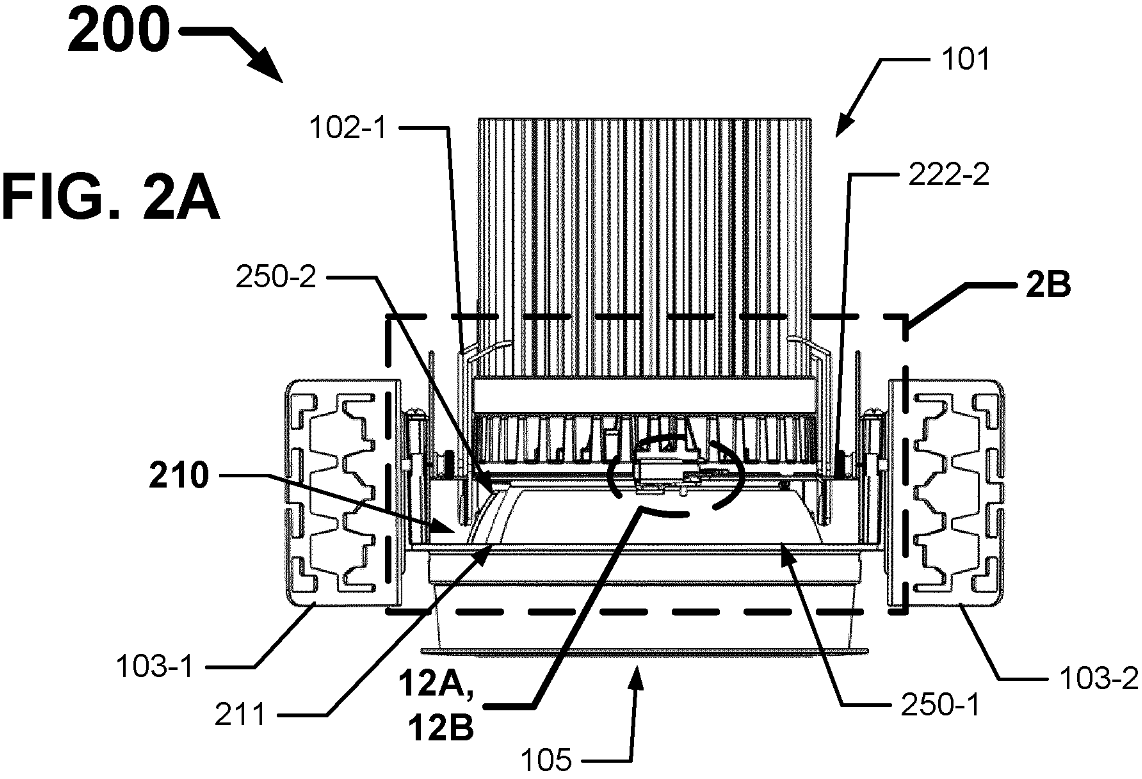
FIGS. 2A through 2C show various views of a recessed luminaire according to certain example embodiments.
Figure 2B:
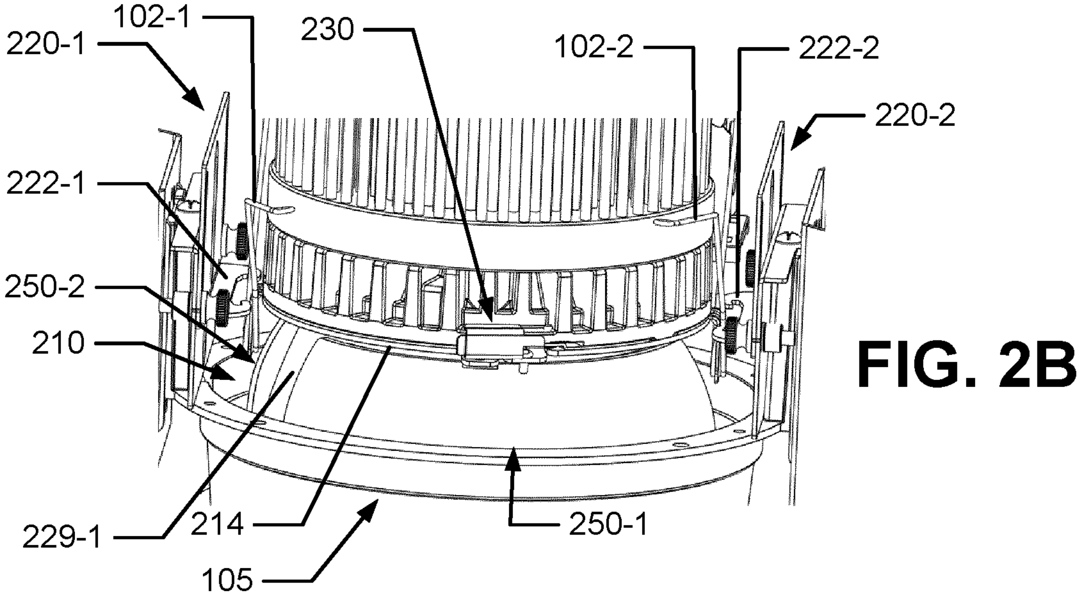
Figure 2C:
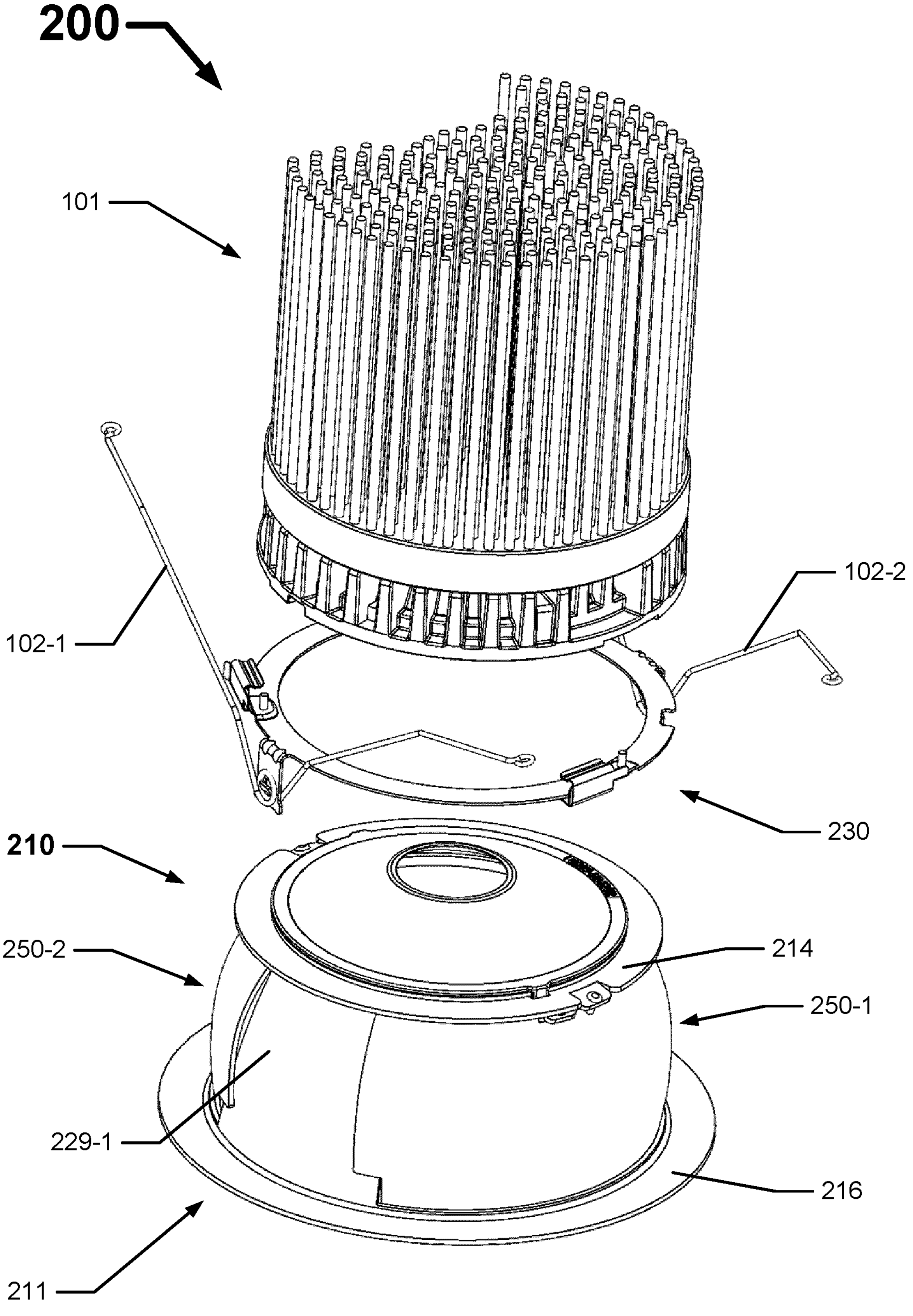

FIGS. 2A through 2C show various views of a recessed luminaire 200 according to certain example embodiments. Specifically, FIG. 2A shows a side view of the recessed luminaire 200. FIG. 2B shows a detailed side view of the recessed luminaire 200. FIG. 2C shows an exploded perspective view of the recessed luminaire 200 without the frame 105. The recessed luminaire 200 of FIGS. 2A through 2C includes a frame 105, a heat sink assembly 101, a trim assembly 210, a securing assembly 230, a pair of torsion spring receiver bracket assemblies 220 (torsion spring receiver bracket assembly 220-1 and torsion spring receiver bracket assembly 220-2), a pair of torsion springs 102 (torsion spring 102-1 and torsion spring 102-2), and a pair of mounting brackets 103 (mounting bracket 103-1 and mounting bracket 103-2). Referring to FIGS. 1 through 2C, the frame 105, the heat sink assembly 101, the pair of torsion springs 102, and the pair of mounting brackets 103 of the recessed luminaire 200 of FIGS. 2A through 2C are substantially the same as the corresponding components of the recessed luminaire 190 of FIG. 1.

The trim assembly 210 of the recessed luminaire 200 of FIGS. 2A through 2C includes multiple components. For example, in this case, the trim assembly 210 includes a trim body 211 (which includes at least one trim side wall 229, a trim flange 214 fixedly disposed atop the at least one trim side wall 229, and a trim flange 216 fixedly disposed at the bottom of the at least one trim side wall 229) and two removable panels 250 (in this case, removable panel 250-1 and removable panel 250-2). Each removable panel 250 is disposed in an opening in the at least one trim side wall 229. Further details about the trim assembly 210 are provided below with respect to FIGS. 3A through 3E.

Each of the torsion spring receiver bracket assemblies 220 of the recessed luminaire 200 of FIGS. 2A through 2C includes an adjustable torsion spring receiver bracket 222. Each adjustable torsion spring receiver bracket 222, which engages a torsion spring 102, can raise or lower the arms of the torsion spring 102 based on the height to which the torsion spring receiver bracket 222 is set. Further details about the torsion spring receiver bracket assemblies 220 are provided below with respect to FIGS. 6A through 7C.

In some cases, instead of torsion springs 102, the recessed luminaire 200 can use other additional or alternative components (e.g., mounting bars) for securing the recessed luminaire 200 within a recessed area (e.g., a plenum space). In such a case, the torsion spring receiver bracket assemblies 220 can be optional components that are omitted from the recessed luminaire 200. In cases where torsion springs 102 are included in the recessed luminaire 200, there can be a single torsion spring 102 or more than 2 torsion springs 102. In such a case, there can be a single torsion spring receiver bracket assembly 220 or more than 2 torsion spring receiver bracket assemblies 220 included in the recessed luminaire 200.

In certain example embodiments, the securing assembly 230 of the recessed luminaire 200 of FIGS. 2A through 2C is used to secure the heat sink assembly 101 and the trim assembly 210 in a constant vertical orientation with respect to each other while also allowing the trim assembly 210 to rotate about a vertical axis with respect to the heat sink assembly 101. The securing assembly 230 can include multiple components. Details about the components of an example securing assembly 230 are discussed below with respect to FIGS. 4A through 4C.

Figure 3A:
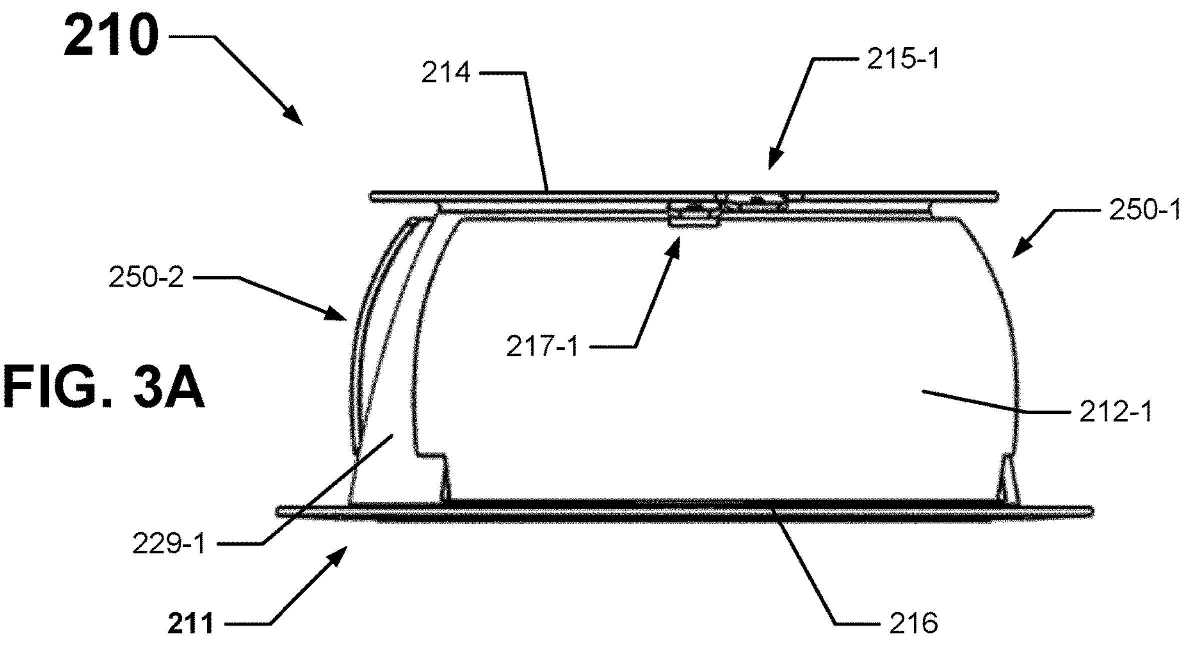
FIGS. 3A through 3E show various views of the trim assembly of the recessed luminaire of FIGS. 2A through 2C.
Figure 3B:
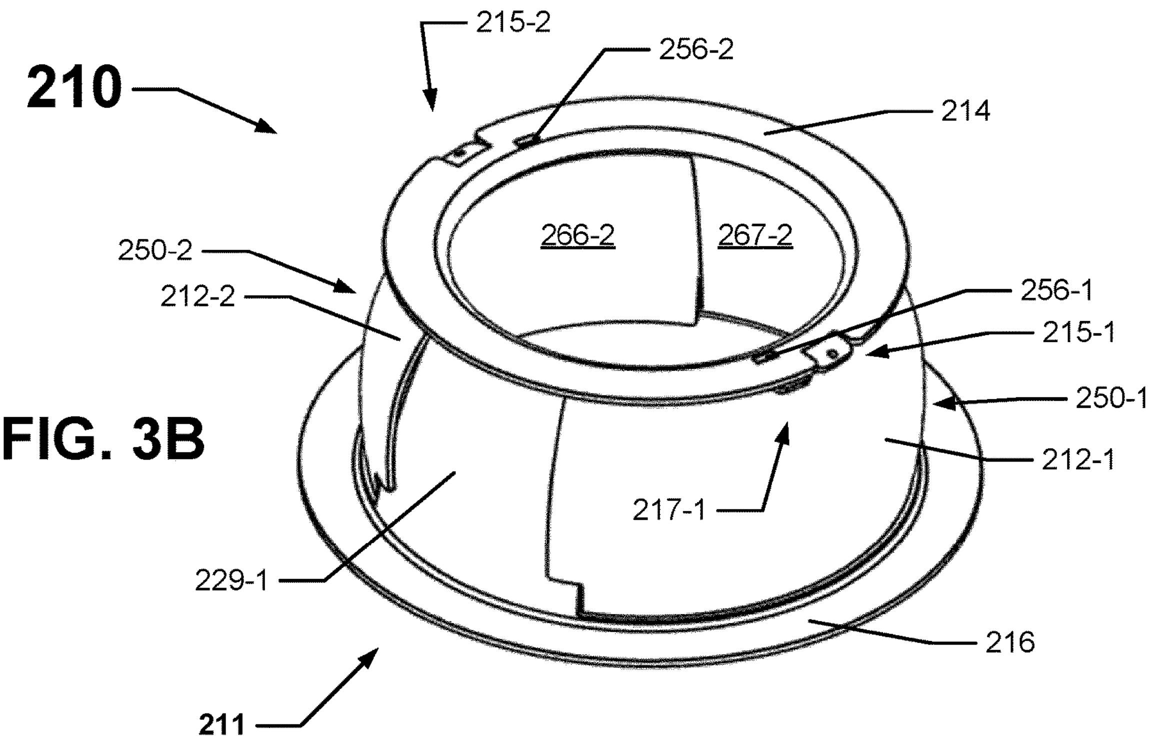
Figure 3C:
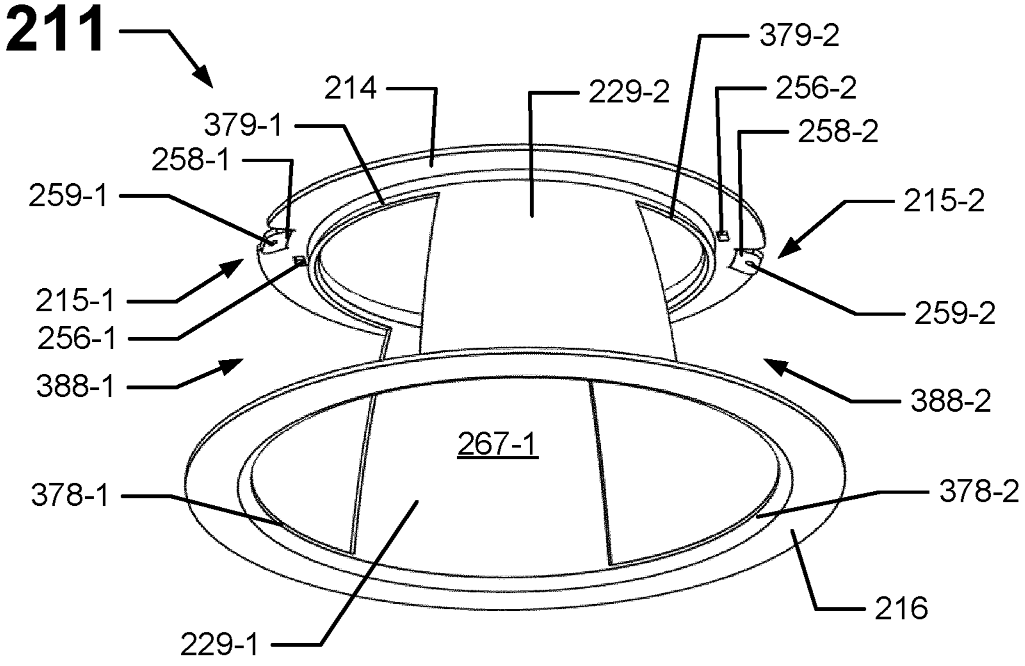
Figure 3D:
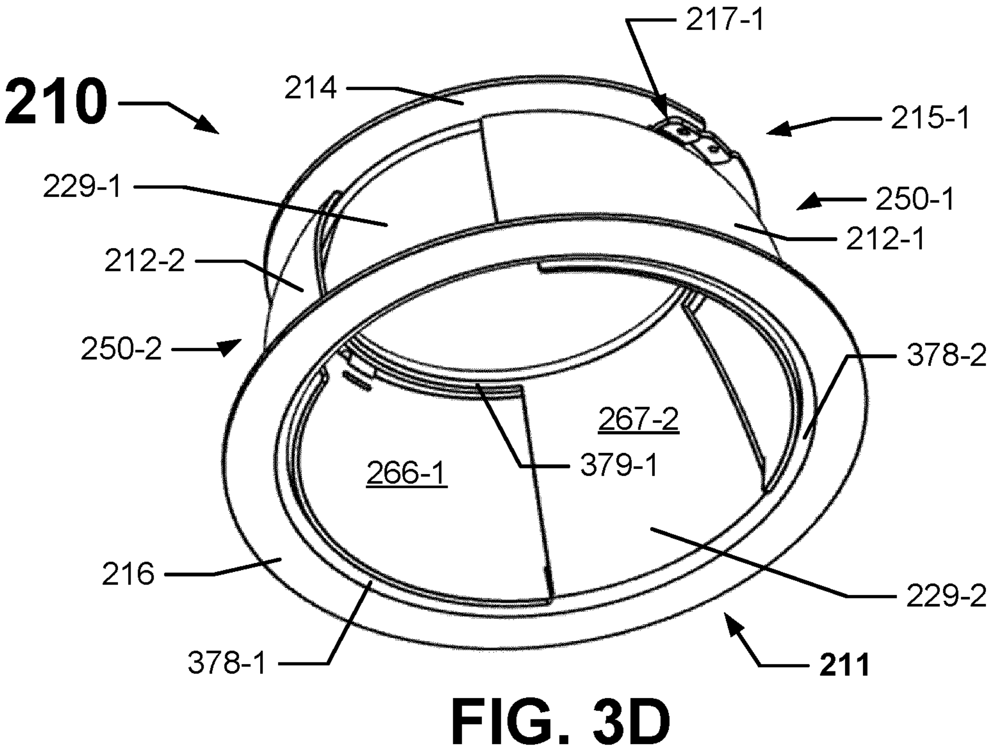
Figure 3E:
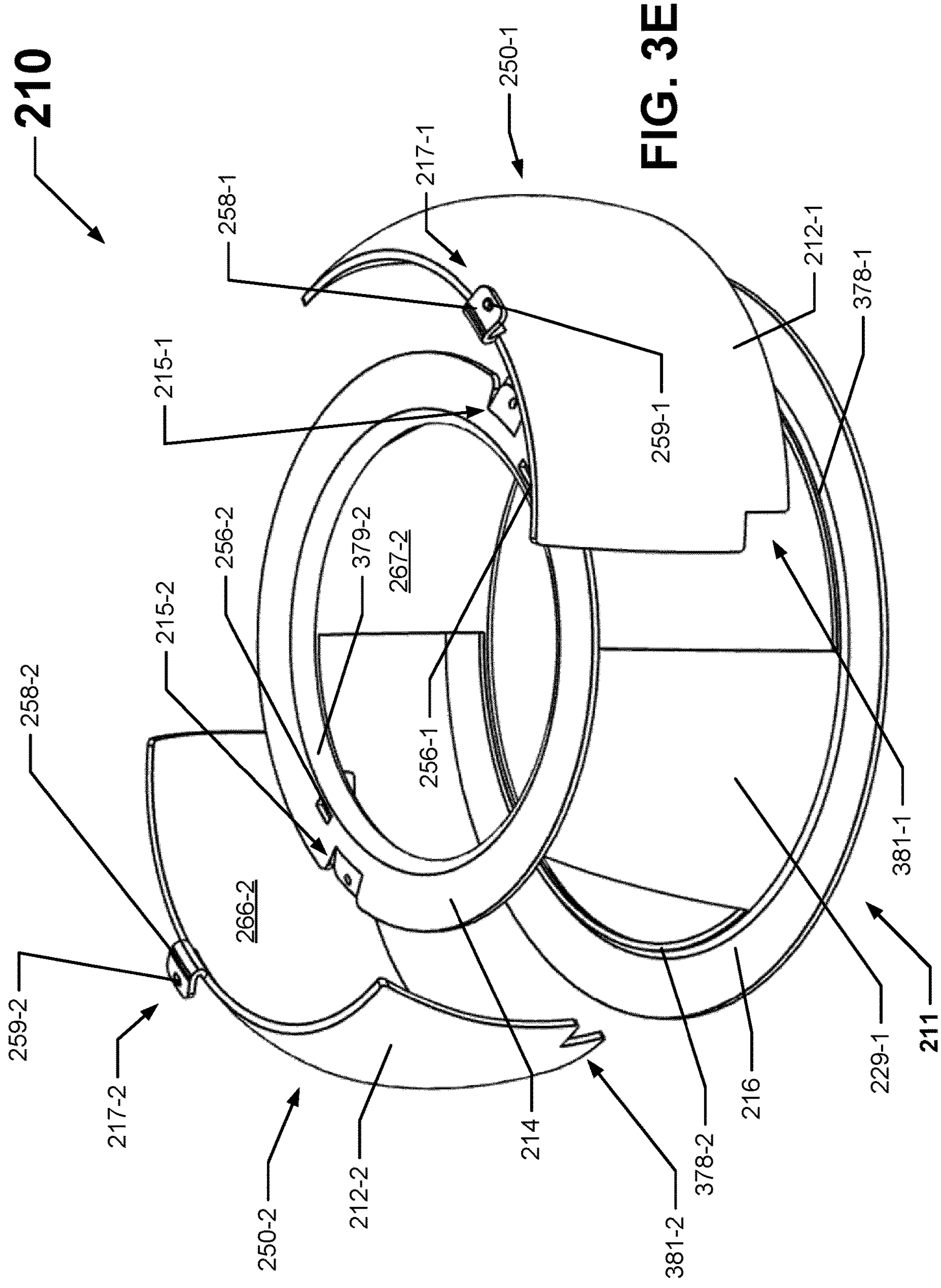

FIGS. 3A through 3E show various views of the trim assembly 210 of the recessed luminaire 200 of FIGS. 2A through 2C. Specifically, FIG. 3A shows a side view of the trim assembly 210. FIG. 3B shows a top-perspective view of the trim assembly 210. FIG. 3C shows a bottom-perspective view of a portion of the trim assembly 210. FIG. 3D shows a bottom-perspective view of the trim assembly 210. FIG. 3E shows an exploded top-perspective view of the trim assembly 210.

Referring to FIGS. 1 through 3E, as discussed above, the trim body 211 of the trim assembly 210 has at least one trim side wall 229, a trim flange 214 that extends laterally away from the top of the at least one trim side wall 229, and another trim flange 216 that extends laterally away from the bottom of the at least one trim side wall 229. The at least one trim side wall 229 of the trim body 211 is generally conically shaped in this case, although the at least one trim side wall 229 can have any of a number of other general shapes (e.g., cylindrical, cubic). The characteristics of the trim body 211 are such that at least a portion of the trim body 211 can be rotatably (with respect to a vertical axis) disposed inside of the frame 105.

Further, in some cases, as in this example, the at least one trim side wall 229 between the trim flange 214 and the trim flange 216 is not continuous. Specifically, the at least one trim side wall 229 has at least one opening 388. In this case, the at least one trim side wall 229 has two sections (trim side wall section 229-1 and trim side wall section 229-2) with 2 openings 388, identified as opening 388-1 and opening 388-2, disposed therebetween. Since the opening 388-1 and the opening 388-2 substantially extend vertically from the trim flange 214 to trim flange 216, the trim side wall section 229-1 and the trim side wall section 229-2 are substantially physically separated from each other. In alternative embodiments, the trim body 211 can have a single trim side wall 229 with one or more openings 388 that do not substantially extend to both the trim flange 214 and the trim flange 216. In yet other alternative embodiments, the trim body 211 has a single trim side wall 229 with no openings 388 therein.

In certain example embodiments, the trim assembly 210 is used to manipulate (e.g., reflect, refract) light emitted by the light sources of the recessed luminaire 200. As a result, the inner surfaces of the trim assembly 210 may include a special coating and/or be made of a particular material to generate the desired lighting effect, such as a wall wash. The trim side wall 229 (or sections thereof) have an inner surface 267 that can be used to manipulate light emitted by the light sources of the recessed luminaire 200. In this case, the trim side wall 229-1 has an inner surface 267-1, and the trim side wall 229-2 has an inner surface 267-2.

When the at least one trim side wall 229 has multiple openings 388, as in this example, one opening 388 (e.g., opening 388-1) can have one or more characteristics (e.g., shape, size) that are the same as or different than the corresponding characteristics of the other openings 388. Further, when the at least one trim side wall 229 of the trim body 211 has multiple openings 388, the openings 388 can be spaced in any manner (e.g., equidistantly, randomly) around the trim body 211. In this case, the opening 388-1 and the opening 388-2 in the at least one trim side wall 229 (between trim side wall section 329-1 and trim side wall section 329-2) have the same characteristics and are spaced equidistantly from each other. In certain example embodiments, each opening 388 is configured to be filled or covered by a removable panel 250, discussed below.

The trim flange 216 is configured to support the frame 105. In other words, the bottom of the frame 105 abuts against the top surface of the trim flange 216. As a result, the length of the trim flange 216 (the distance that the trim flange 216 extends away from the at least one trim side wall 229) is at least great enough to exceed the size (e.g., the diameter) of the bottom of the frame 105. In some cases, as in this example, the top surface of the trim flange 216 has no features to help secure the frame 105 against the trim flange 216. In alternative embodiments, the top surface of the trim flange 216 can include one or more features (e.g., grooves, protrusions, tabs, detents) that can be used to help secure the frame 105 against the trim flange 216.

The trim flange 214 of the trim body 211 of the trim assembly 210 is configured to be movably disposed within the securing assembly 230. Specifically, the trim flange 214 is configured to be vertically secured within the securing member assemblies 425 (discussed in more detail below with respect to FIGS. 4A through 4D) of the securing assembly 230 while also being able to rotate about the vertical axis. When viewed from above, the trim flange 214 is circular in shape.

In certain example embodiments, the trim flange 214 includes one or more features. For example, as shown in FIGS. 3A through 3E, the trim flange 214 can include one or more downward-protruding tabs 215. In this case, the trim flange 214 has two downward-protruding tabs 215 (tab 215-1 and tab 215-2) that are spaced substantially equidistantly from each other and approximately halfway between trim side wall section 229-1 and trim side wall section 229-2. The tabs 215 of the trim flange can serve any of a number of purposes. For example, in this case, each tab 215 can be used to secure and/or position a removable panel 250) (discussed below) within an opening 388.

Figure 12A:
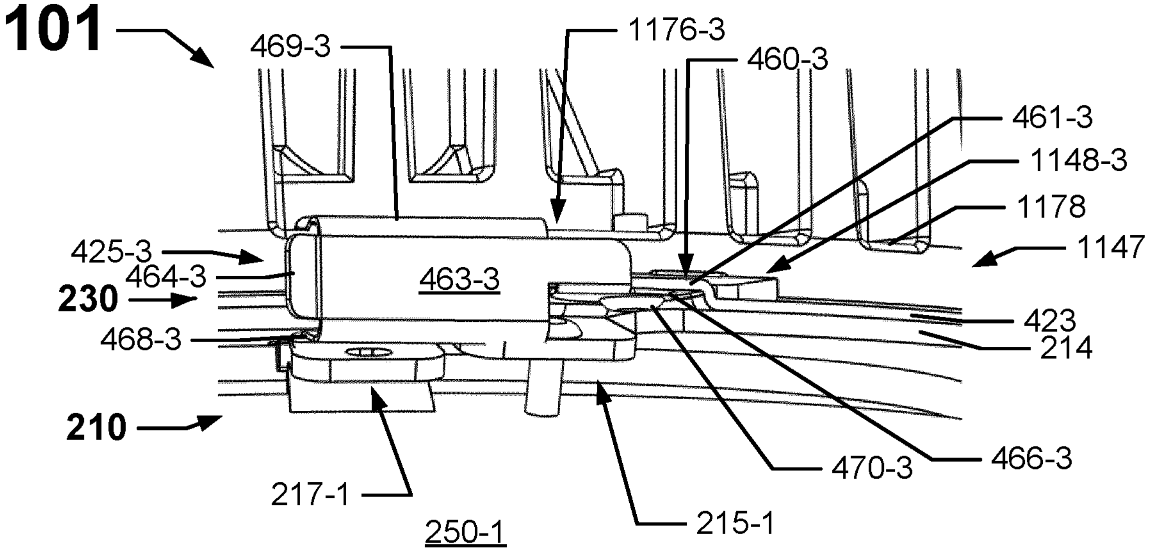
FIGS. 12A and 12B show various views of a portion of the recessed luminaire of FIGS. 2A through 2C.
Figure 12B:
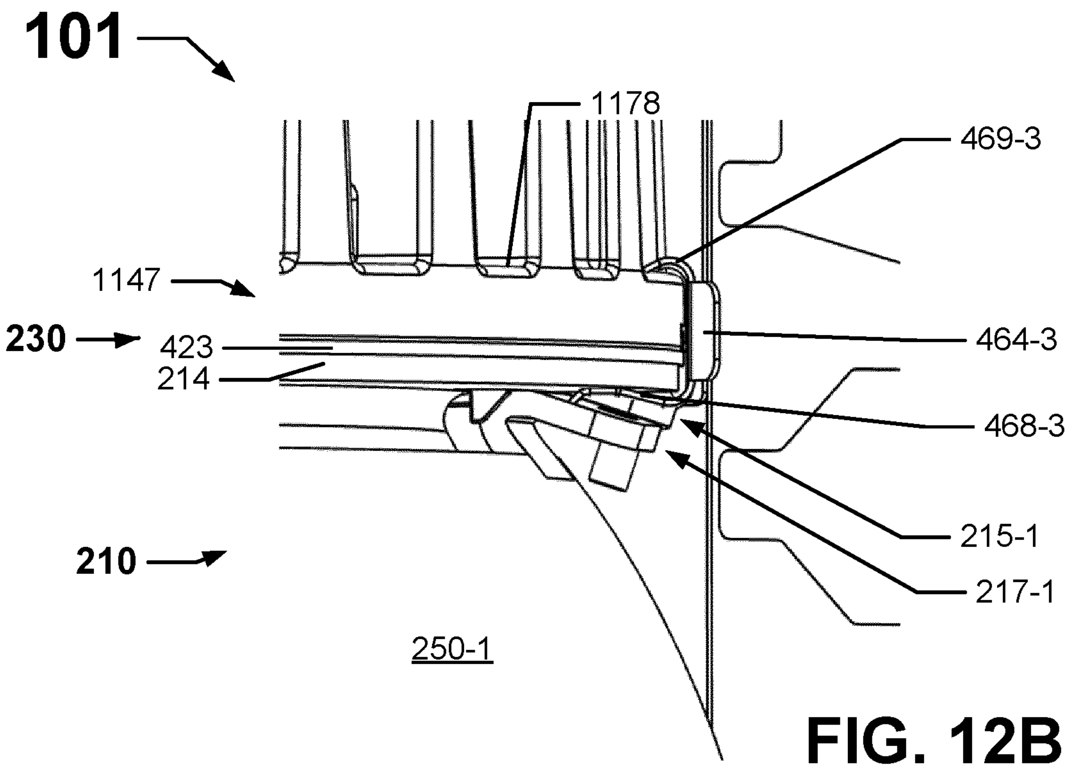

Each tab 215 can have any of a number of configurations. For example, in this case, the tab 215-1 has a tab body 218-1 with an aperture 219-1 that traverses therethrough, and the tab 215-2 has a tab body 218-2 with an aperture 219-2 that traverses therethrough. The tabs 215 are bent downward (toward the trim flange 216) so that the tabs 215 to not interfere with rotation of the trim assembly 210 relative to the securing member assemblies 425 of the securing assembly 230, as shown in FIGS. 12A and 12B below.

In alternative embodiments, there can be one tab 215 or more than two tabs 215. When the trim flange 214 has multiple tabs 215, one tab 215 (e.g., tab 215-1) can have one or more characteristics (e.g., size, shape, thickness, with or without the aperture 219) that are the same as or different than the corresponding characteristics of the other tabs 215. The tabs 215 are configured substantially similar to each other in this case. Also, when the trim flange 214 has multiple tabs 215, the tabs 215 can have any spacing (e.g., equidistant, random) around the trim flange 214. Further, each tab 215 can be positioned at any point along the width (between the inner perimeter and the outer perimeter) of the trim flange 214. For example, in this case, each tab 215 is located along the outer perimeter of the trim flange 214. Specifically, each tab 215 is cut out from the trim flange 214 at the outer perimeter into approximately half of the width, and subsequently bent downward.

As another example of a feature of the trim flange 214, the trim flange 214 can include one or more securing features 256. In such a case, each of the securing features 256 can be configured to help secure a removable panel 250 within an opening 388. Each securing feature 256 in this case is a slot inside of which part of a tab 217 of a removable panel 250) (discussed below) can be secured. As an alternative to a slot, a securing feature 256 can have any of a number of other configurations (e.g., a detent, an aperture through which an independent coupling feature (e.g., a screw) can be disposed, a clip) that complement a corresponding feature (in this case, the top of a tab 217, discussed below) of the removable panel 250. In other words, the location, shape, size, and other characteristics of each securing feature 256 is configured to complement the corresponding characteristics of the complementary feature (in this case, the tab body 258 of a tab 217) on the removable panel 250) that is to be secured by the securing feature 256. The number of securing features 256 can correspond to the number of complementary features of all of the removable panels 250. Each securing feature 256 in this case is located proximate to the inner perimeter of the trim flange 214 adjacent to the collar 379.

In certain example embodiments, in places where an opening 388 exists in a trim side wall the opening vertically stretches from the trim flange 214 to the trim flange 216. In other cases, as in this example, the opening 388 fails to extend vertically to the trim flange 214 and/or to the trim flange 216. In such instances, there is a collar 379 that extends from the bottom of the trim flange 214 to the opening 388 and/or a collar 378 that extends from the top of the trim flange 216 to the opening 388. In this example, there is a collar 378 and a collar 379. Specifically, collar 379-1 bounds the top of the opening 388-1 and collar 378-1 bounds the bottom of the opening 388-1. Similarly, collar 379-2 bounds the top of the opening 388-2 and collar 378-2 bounds the bottom of the opening 388-2.

The characteristics (e.g., height, thickness, radius of curvature, coating, material) of the collar 378 and/or the collar 379 (or portions thereof) can be configured so that there is a slight overlap between the collar 378 and the top end of a removable panel 250) and/or between the collar 379 and the bottom end of a removable panel 250. In this case, the top of the removable panel 250-1 overlaps most, if not all, of collar 379-1, and the bottom of the removable panel 250-1 overlaps most, if not all, of collar 378-1. Similarly, the top of the removable panel 250-2 overlaps most, if not all, of collar 379-2, and the bottom of the removable panel 250-2 overlaps most, if not all, of collar 378-2.

As discussed above, the trim assembly 210 can include one or more removable panels 250). In this example, there are two removable panels 250 (removable panel 250-1 and removable panel 250-2). Each removable panel 250 is configured to at least partially fill an opening 388 in the trim body 211. For example, in this case, the removable panel 250-1 fills the opening 388-1 in the trim body 211, and the removable panel 250-2 fills the opening 388-2 in the trim body 211.

Each removable panel 250 has a panel wall 212 that has characteristics (e.g., size, curvature, shape) that are configured to fill a corresponding opening 388. For example, in this case, removable panel 250-1 has a panel wall 212-1 that is curved with a slightly larger radius than that of the adjacent trim side wall section 229-1 and trim side wall section 229-2 to cover opening 388-1. Similarly, removable panel 250-2 has a panel wall 212-2 that is curved with a slightly larger radius than that of the adjacent trim side wall section 229-1 and trim side wall section 229-2 to cover opening 388-2. In this case, the characteristics of the removable panel 250-1 are the same as the removable panel 250-2. In alternative embodiments, at least one of the characteristics of one removable panel 250 (e.g., removable 30) panel 250-1) can be different than the corresponding characteristics of another removable panel 250 of the trim assembly 210.

To help fill an opening 388 more completely in light of the larger curvature of the panel wall 212 relative to the curvature of the trim side wall 229 in this example, each removable panel 250 can have a recess feature 381 in each lower corner of the panel wall 212. Each recess feature 381 can have any characteristics (e.g., shape, size, location) that are suitable for its purpose. In this case, the panel wall 212-1 of the removable panel 250-1 has a square-shaped recess feature 381-1 in both lower corners, and the panel wall 212-2 of the removable panel 250-2 has a square-shaped recess feature 381-2 in both lower corners.

In certain example embodiments, a removable panel 250 includes one or more features. For example, as shown in FIGS. 3A through 3E, each removable panel 250 can include one or more downward-extending tabs 217 that extend from the top edge of the panel wall 212. In this case, the removable panel 250-1 has a downward-extending tab 217-1, and the removable panel 250-2 has a similar downward-extending tab 217-2. The downward-extending tab 217-1 of the removable panel 250-1 is positioned in such a way that, when the removable panel 250-1 is positioned within the opening 388-1 of the trim body 211, the tab 217-1 abuts against the tab 215-1 disposed on the trim flange 214. Similarly, the downward-extending tab 217-2 of the removable panel 250-2 is positioned in such a way that, when the removable panel 250-2 is positioned within the opening 388-2 of the trim body 211, the tab 217-2 abuts against the tab 215-2 disposed on the trim flange 214.

The tab 217 on a removable panel 250 can serve any of a number of purposes. For example, in this case, each tab 217 can be used to help secure and/or position a corresponding removable panel 250 within an opening 388. Specifically, in this case, the vertically-utmost portion of the tab body 258-1 of the tab 217-1 is configured to engage (e.g., be disposed within) the securing feature 256-1 of the flange trim 214 when the removable panel 250-1 is disposed in the opening 388-1. Similarly, the vertically-utmost portion of the tab body 258-2 of the tab 217-2 is configured to engage (e.g., be disposed within) the securing feature 256-2 of the flange trim 214 when the removable panel 250-2 is disposed in the opening 388-2.

Each tab 217 can have any of a number of configurations. For example, in this case, the tab 217-1 has the tab body 258-1 with an aperture 259-1 that traverses therethrough, and the tab 217-2 has the tab body 258-2 with an aperture 259-2 that traverses therethrough. The tabs 217 are bent downward so that the tabs 217 to not interfere with rotation of the trim assembly 210 relative to the securing members 425 of the securing assembly 230, as shown in FIGS. 12A and 12B below.

In alternative embodiments, there can be more than one tab 217 on each removable panel 250. One tab 217 (e.g., tab 217-1) can have one or more characteristics (e.g., size, shape, thickness, with or without the aperture 259) that are the same as or different than the corresponding characteristics of another tab 217, whether on the same removable panel 250 or on a different removable panel 250. The tab 217-1 and the tab 217-2 are configured substantially similar to each other in this case, but in alternative embodiments one tab 217 can be configured differently (e.g., in the form of a planar protrusion) from another tab 217, whether on the same or different removable panels 250. Also, when the trim flange 214 has multiple tabs 215, the tabs 215 can have any spacing (e.g., equidistant, random) around the trim flange

214. Further, each tab 215 can be positioned at any point along the width (between the inner perimeter and the outer perimeter) of the trim flange 214. For example, in this case, each tab 215 is located along the outer perimeter of the trim flange 214. Specifically, each tab 215 is cut out from the trim flange 214 at the outer perimeter into approximately half of the width, and subsequently bent downward.

Each removable panel 250 has an inner surface 266 that can include a special coating and/or be made of a particular material to generate a desired lighting effect, such as a wall wash, for light emitted by the light sources of the recessed luminaire 200. In this case, the removable panel 250-1 has an inner surface 266-1, and the removable panel 250-2 has an inner surface 266-2.

Figure 4A:
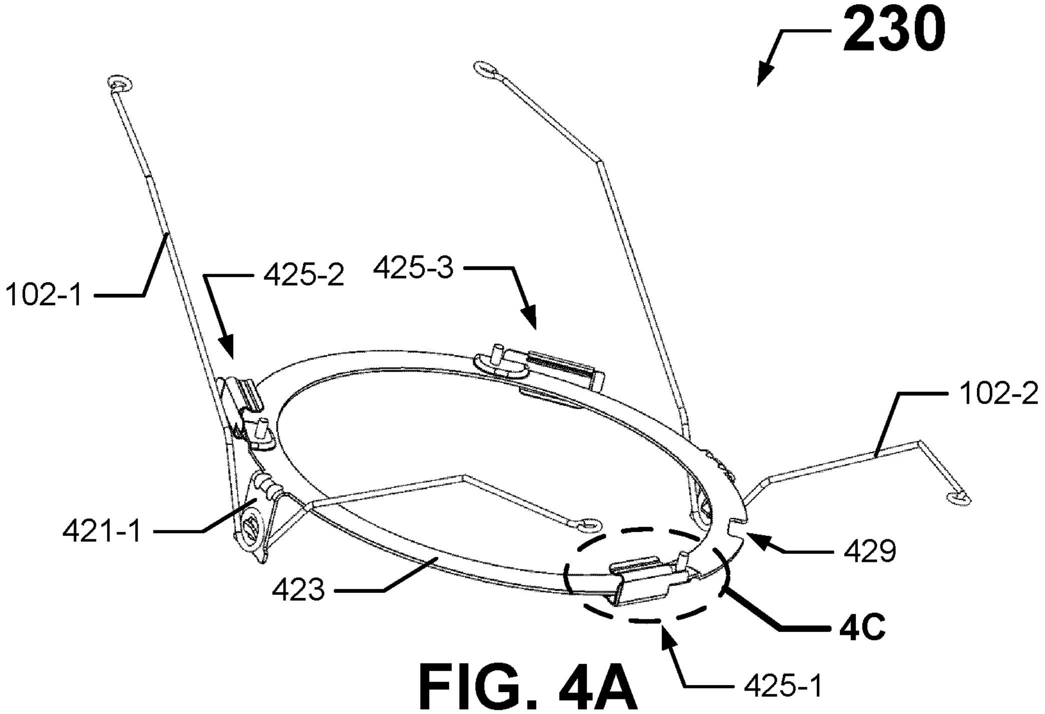
FIGS. 4A through 4D show various views of the securing assembly of the recessed luminaire of FIGS. 2A through 2C.
Figure 4B:
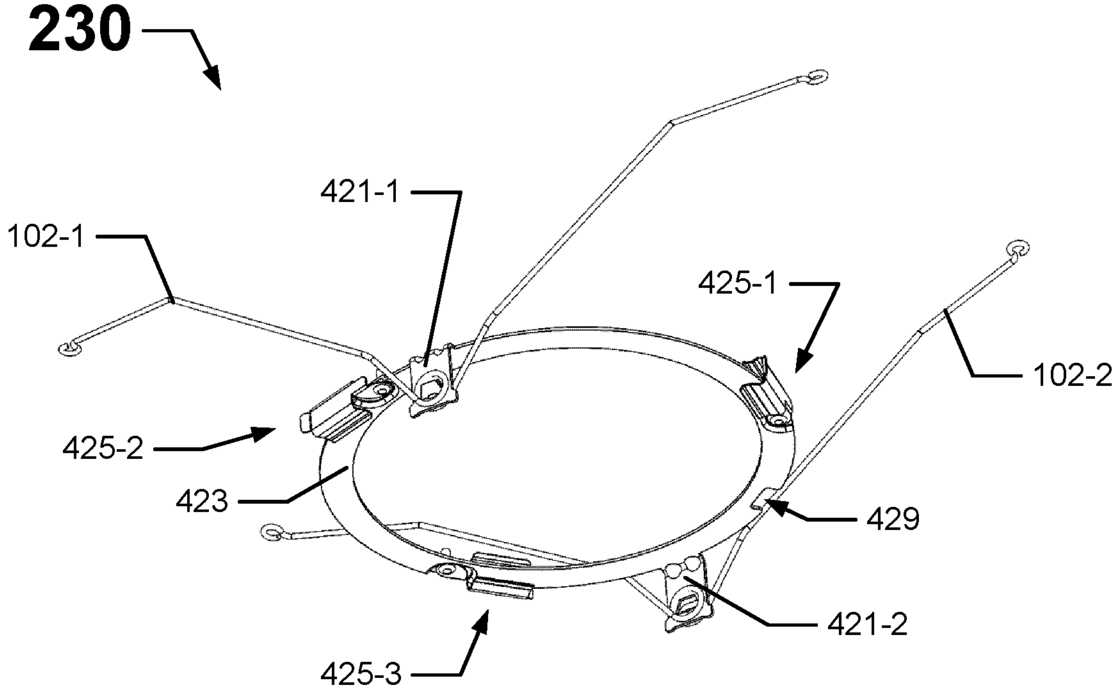
Figure 4C:
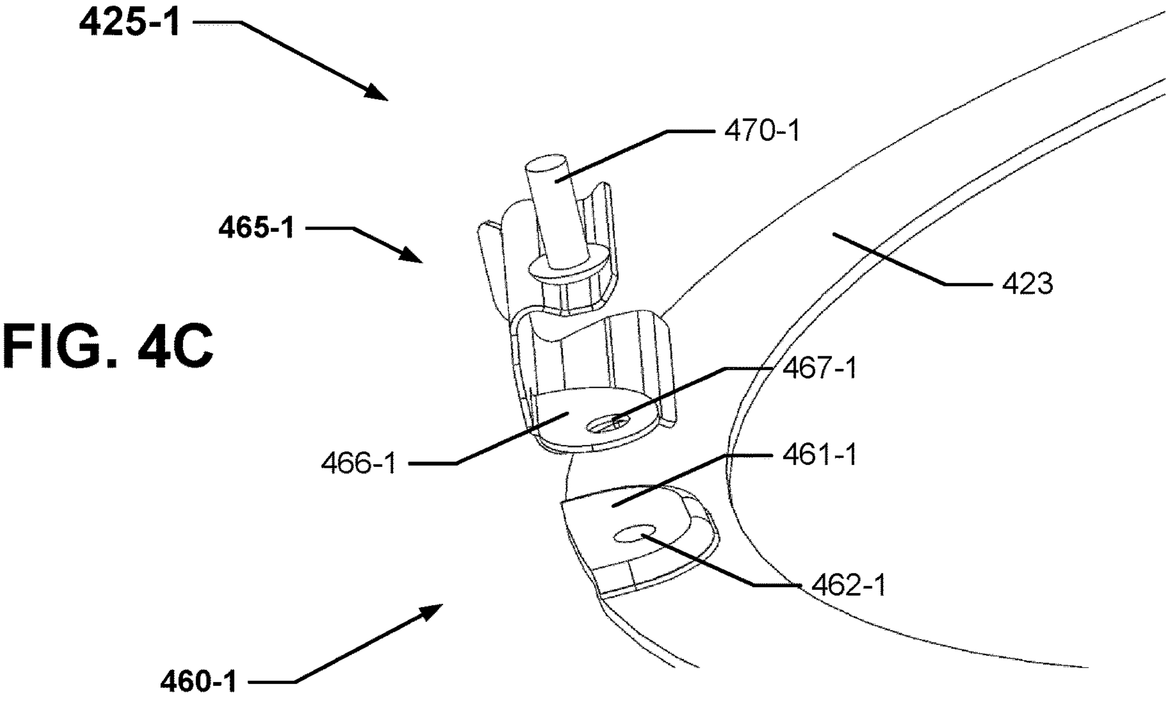
Figure 4D:
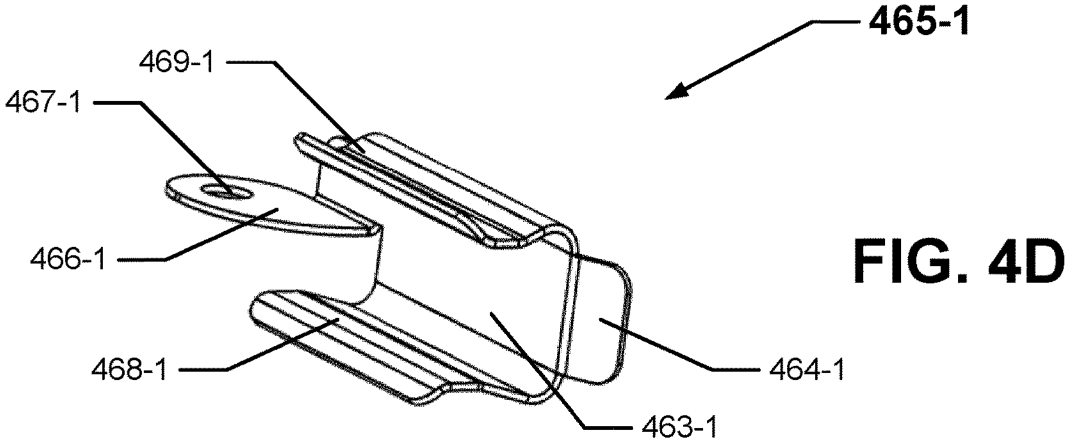

FIGS. 4A through 4D show various views of the securing assembly 230 of the recessed luminaire 200 of FIGS. 2A through 2C. Specifically, FIG. 4A shows a top perspective view of the securing assembly 230. FIG. 4B shows a bottom perspective view of the securing assembly 230. FIG. 4A shows a detailed view of the securing member assembly 425-1 from FIG. 4A. FIG. 4D shows the bracket 465-1 of the securing member assembly 425-1 of FIG. 4C.

Referring to FIGS. 1 through 4D, the securing assembly 230 of FIGS. 4A through 4D can include multiple components. In this example, the securing assembly 230 includes a securing assembly flange 423, a pair of torsion spring brackets 421 (torsion spring bracket 421-1 and torsion spring bracket 421-2) coupled to the securing assembly 423 flange, the torsion springs 102 coupled to the torsion spring brackets 421 (torsion spring 102-1 coupled to torsion spring bracket 421-1 and torsion spring 102-2 coupled to torsion spring bracket 421-2), and three securing member assemblies 425 (securing member assembly 425-1, securing member assembly 425-2, and securing member assembly 425-3).

In certain example embodiments, the securing assembly flange 423 has certain characteristics (e.g., shape, size) that allow the securing assembly 230 to provide a coupling mechanism between the trim assembly 210 and the heat sink assembly 101. In this case, the securing assembly flange 423 is circular in shape and has a diameter that is substantially the same as the diameter of the trim flange 214 of the trim assembly 210 and as the diameter of the collar 1147 of the heat sink assembly 101.

The securing assembly flange 423 is substantially planar, except for the protruding features 460. Each of the protruding features 460 (in this case, protruding feature 460-1, protruding feature 460-2, and protruding feature 460-3) is raised above the upper surface of the securing assembly flange 423. Each protruding feature 460 (e.g., protruding feature 460-1) is configured to allow a securing member 465 (e.g., securing member 465-1) to become movably (in this case, hingedly) coupled to the securing assembly flange 423. Each protruding feature 460 in this case is similarly configured, although in alternative embodiments having multiple protruding features 460, one protruding feature 460 (e.g., protruding feature 460-1 can have one or more characteristics (e.g., configuration, size) that are different from the corresponding characteristics of another protruding feature 460.

In this example, each protruding feature 460 includes a body 461 and a coupling feature 462. For instance, as shown in FIG. 4C, protruding feature 460-1 includes a body 461-1 and a coupling feature 462-1. The body 461-1 in this case is planar and substantially parallel with the upper surface of the securing assembly flange 423, although in alternative embodiments, the body 461-1 of the protruding feature 460-1 can have any of a number of other features and/or configurations relative to what is shown in FIG. 4C. For example, the body 461-1 can be rounded, have ridges, and/or be made of a different material (e.g., rubber rather than aluminum). The space formed underneath the body 461-1 of the protruding feature is sufficient to house the coupling body 466-1 of the securing member 465-1, including allowing for rotation of coupling body 466-1 around an axis through the coupling feature 462-1 disposed in the body 4611-1.

The coupling feature 462-1 of the protruding feature 460-1 is configured to allow the protruding feature 460-1 to couple, directly or indirectly, to the securing member 465-1 of the securing member assembly 425-1 while also allowing the securing member 465-1 to rotate relative to the protruding feature 460-1. The coupling feature 462-1 in this example is in the form of an aperture that traverses the body 461-1 so that an independent coupling feature 470-1 (in this case, in the form of a rivet) can be disposed therein. The position of the coupling feature 462-1 is offset from the center of the body 461-1 based on the configuration of the coupling body 466-1 and the coupling feature 467-1 of the securing member 465-1. In other words, the coupling feature 462-1 of the protruding feature 460-1 is configured to complement the coupling feature 467-1 of the securing member 465-1 so that the securing member 465-1 can be movably coupled to the protruding feature 460-1.

In certain example embodiments, the securing member 465-1 of the securing member assembly 425-1 is configured to retain multiple components (e.g., the trim assembly 210, the heat sink assembly 101) in a substantially constant vertical orientation while allowing the trim assembly 210 to rotate about a vertical axis relative to the heat sink assembly 101 and the securing member assembly 425-1. The securing member 465-1 can have any of a number of configurations. For example, in this case, the securing member 465-1 is a C-shaped bracket or spring clip having a back wall 463-1, a top wall 469-1 that extends from the top of the back wall 463-1, and a bottom wall 468-1 that extends from the bottom of the back wall 463-1. The securing member 465-1 in this example also includes a control feature 464-1 that extends from one end of the back wall 463-1 and the coupling body 466-1 (along with the coupling feature 467-1) that is disposed on the opposite end of the back wall 463-1 relative to the control feature 464-1. In this spring clip configuration, the top wall 469-1 and the bottom wall 468-1

The back wall 463-1, the top wall 469-1, and the bottom wall 468-1 of the securing member 465-1 can be formed from a single piece or from multiple pieces that are coupled to each other. In either case, the top wall 469-1 and/or the bottom wall 468-1 can be resiliently flexible with respect to the back wall 463-1. In other words, the distance between the top wall 469-1 and the bottom wall 468-1 can be temporarily expanded so that one or more components (e.g., the trim flange 214, the collar 1147 of the heat sink assembly 101) can be disposed within the space formed between the back wall 463-1, the top wall 469-1, and the bottom wall 468-1. Subsequently, distance between the top wall 469-1 and the bottom wall 468-1 can be decreased toward a default position in a manner that the other components of the recessed luminaire 200 are retained in a vertical position with respect to each other while still allowing one or more of the components (e.g., the trim assembly 210) to rotate with respect to one or more other components (e.g., the heat sink assembly 101, the securing assembly 230) of the recessed luminaire 200.

In certain example embodiments, the control feature 464-1 is configured to allow a user to rotate or otherwise move, without the use of a tool, the securing member 465-1 so that the securing member 465-1 engages with and/or disengages from the trim assembly 210 and/or the heat sink assembly 101. In this case, the control feature 464-1 is an extension of one side of the back wall 463-1 that is bent backward (substantially away from the direction in which the top wall 469-1 and the bottom wall 468-1 extend) at a slight angle relative to the back wall 463-1. In alternative embodiments, the control feature 464-1 can be a separate piece that is mechanically coupled to the back wall 463-1 and/or have any of a number of other configurations that can allow a user to move the securing member 465-1 relative to the securing member, with or without the use of a tool.

The coupling body 466-1 and the associated coupling feature 467-1 of the securing member 465-1 are configured to allow the securing member 465-1 be movably (in this case, rotatably) coupled to the securing assembly flange 423. The coupling body 466-1 and the coupling feature 467-1 can have any of a number of characteristics and configurations. For example, in this case, the coupling body 466-1 is a planar section that extends from the back wall 463-1 between, in parallel with, and in the same direction as the top wall 469-1 and the bottom wall 468-1. In this case, the coupling body 466-1 and the back wall 463-1 are formed from a single piece, but in alternative embodiments they are separate pieces that are mechanically coupled to each other. In some cases, the coupling body 466-1 and the coupling feature 467-1 are omitted from the securing member 465-1.

The coupling feature 467-1 in this case is an aperture that traverses the coupling body 466-1 and is configured to receive an independent coupling feature 470-1 (e.g., a rivet (as in this example), a screw; a hinge). In alternative embodiments, the coupling feature 467-1 is configured to provide direct coupling to the securing assembly flange 423. The location of the coupling feature 467-1 in the coupling body 466-1 in this case is off center to allow for unobstructed rotation of the securing member 465-1 with respect to the other components (e.g., the trim assembly 210, the heat sink assembly 101, the securing assembly flange 423) that are disposed within the space formed by the back wall 463-1, the top wall 469-1, and the bottom wall 468-1 at the time.

The top surface of the coupling body 466-1 of the securing member 465-1 is configured to movably (e.g., slidably) abut against the bottom surface of the body 461-1 of the protruding feature 460-1. Further, the coupling feature 467-1 of the securing member 465-1 is configured to complement (in this case, align with) the coupling feature 462-1 of the protruding feature 460-1. The size (e.g., length, width, height) of the protruding feature 460-1 is configured to be sufficient to allow the coupling body 466-1 to be movably disposed in the space between it and the top surface of the securing assembly flange 423 without limiting the range of motion of the securing member 465.

Each of the torsion spring brackets 421 of the securing assembly 230 is configured to secure one of the torsion springs 102. In this example, the torsion spring bracket 421-1 secures the torsion spring 102-1, and the torsion spring bracket 421-2 secures the torsion spring 102-2. When the securing assembly 230 includes multiple the torsion spring brackets 421, one torsion spring bracket 421 (e.g., torsion spring 421-1) can be substantially the same as or different than the other torsion spring brackets 421. Each torsion spring bracket 421 is coupled to or is an extension of the securing assembly flange 423. In this example, each torsion spring bracket 421 extends downward from the outer perimeter of the securing assembly flange 423 and is oriented substantially perpendicularly to the securing assembly flange 423. The torsion spring bracket 421-1 and the torsion spring bracket 421-2 are spaced equidistantly from each other around the securing assembly flange 423. In alternative embodiments, when there are multiple torsion spring brackets 421, they can be spaced relative to each other in any other fashion.

In certain example embodiments, the securing assembly flange 423 of the securing assembly 230) includes a key receiver 429 that is configured to orient the securing assembly 230 in a particular way with at least one other component of the recessed luminaire 200. In this case, the key receiver 429 is configured to receive a key 1149 disposed in the collar 1147 of the heat sink assembly 101. The key receiver 429 can have any of a number of configurations. In this case, the key receiver 429 is a rectangular cut-out at the outer perimeter of the securing assembly flange 423 between the securing member assembly 425-1 and the torsion spring bracket 421-2. In alternative embodiments, the securing assembly flange 423 can have multiple key receivers 429. In such a case, one key receiver 429 can have characteristics (e.g., shape, size, location along the width of the securing assembly flange 423) that is the same as or different than the corresponding characteristics of the other key receivers 429.

Figure 5:
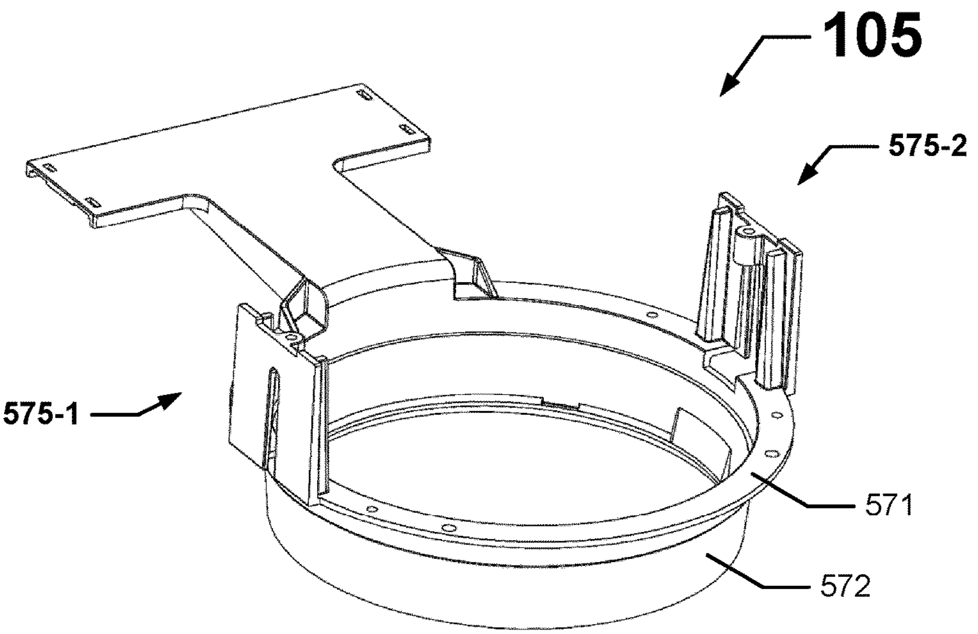
FIG. 5 shows a perspective view of the frame of the recessed luminaire of FIGS. 2A through 2C.

FIG. 5 shows a perspective view of the frame 105 of the recessed luminaire 200 of FIGS. 2A through 2C. Referring to FIGS. 1 through 5, the frame 105 includes a frame wall 571, a frame flange 572 disposed atop of and extending away from the frame wall 571, and one or more frame brackets 575. In this case, there are 2 frame brackets 575 (frame bracket 575-1 and frame bracket 575-2). The frame wall 571 in this case is cylindrical in shape, but the frame wall 571 can have any of a number of other shapes (e.g., conical, cubic) in alternative embodiments. The frame wall 571 and the frame flange 572 are disposed around the trim assembly 210 below the trim flange 214. As shown in FIGS. 2A and 2B above, the torsion spring receiver bracket assemblies 220 can abut against the top surface of the trim flange 214.

The inward-facing surface of each of the frame brackets 575 is configured to couple to and support the torsion spring receiver bracket assemblies 220, discussed in more detail below with respect to FIGS. 6A through 7C. The outward-facing surface of each of the frame brackets 575 can be configured to couple to and secure the mounting brackets 103 of the recessed luminaire 200. The frame brackets 575 in this case are disposed atop the frame flange 572 and are located equidistantly from each other relative to the frame flange 572.

Figure 6A:
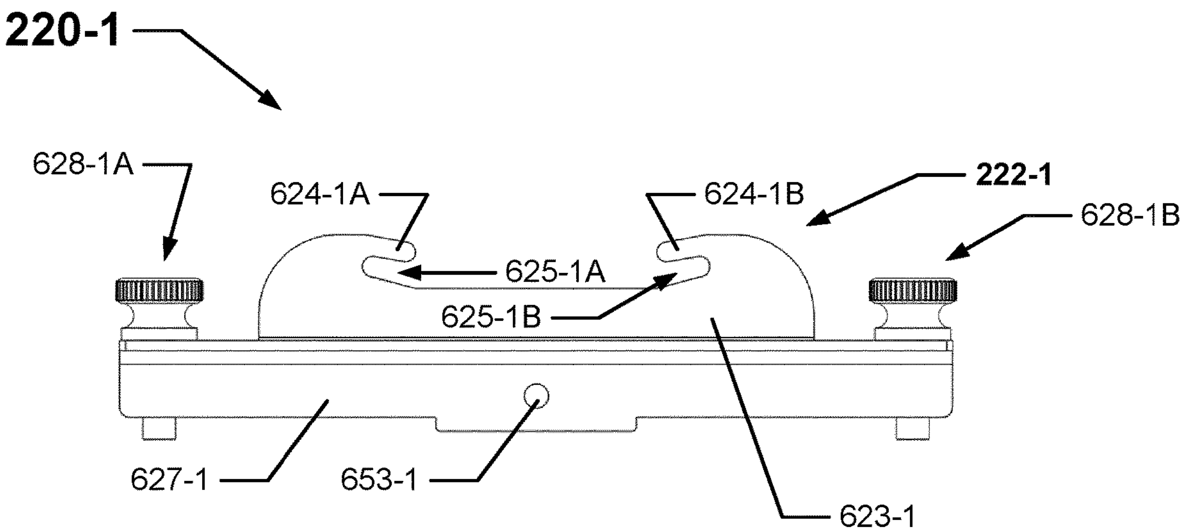
FIGS. 6A through 7C show various views of the torsion spring receiver bracket assembly of the recessed luminaire of FIGS. 2A through 2C.
Figure 6B:
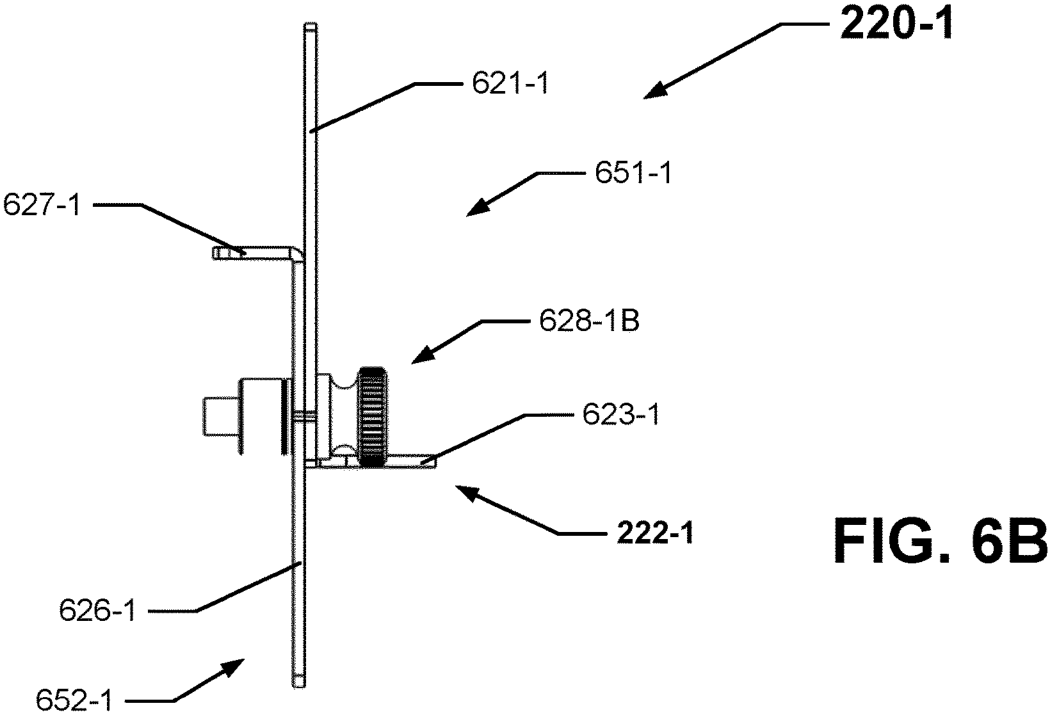
Figure 6C:
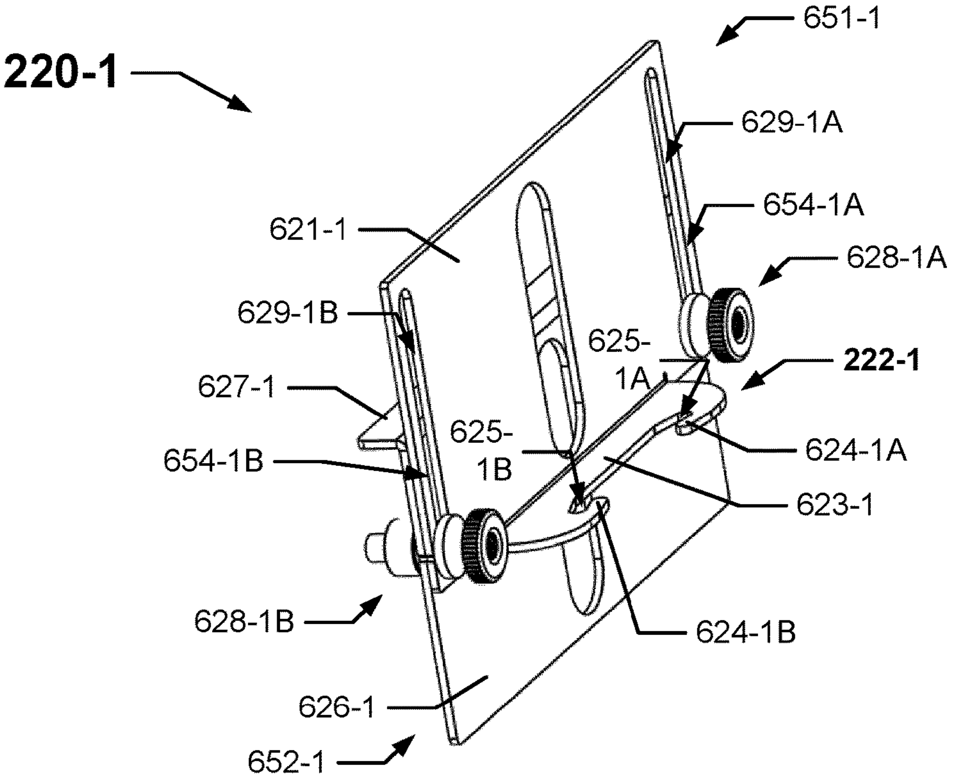
Figure 6D:
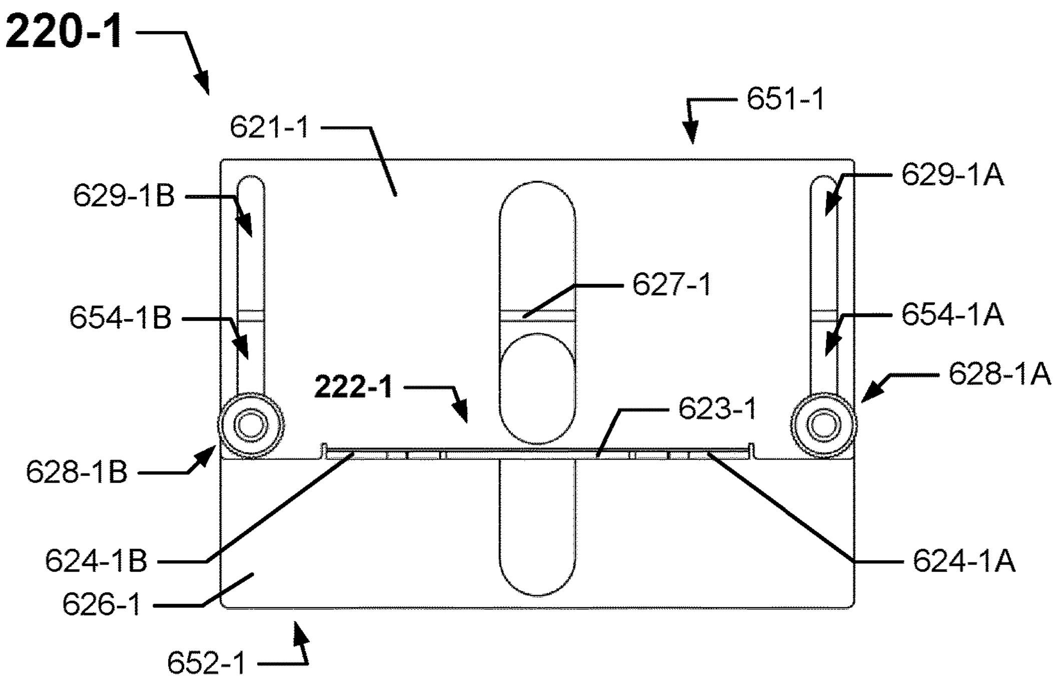
Figure 7A:
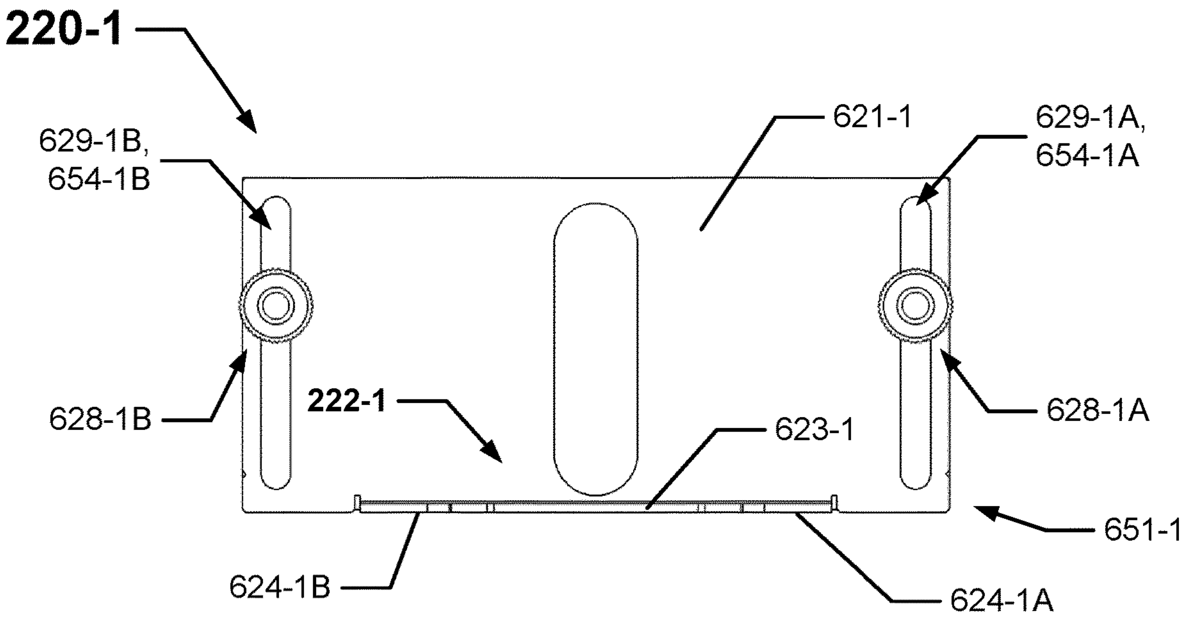
Figure 7B:
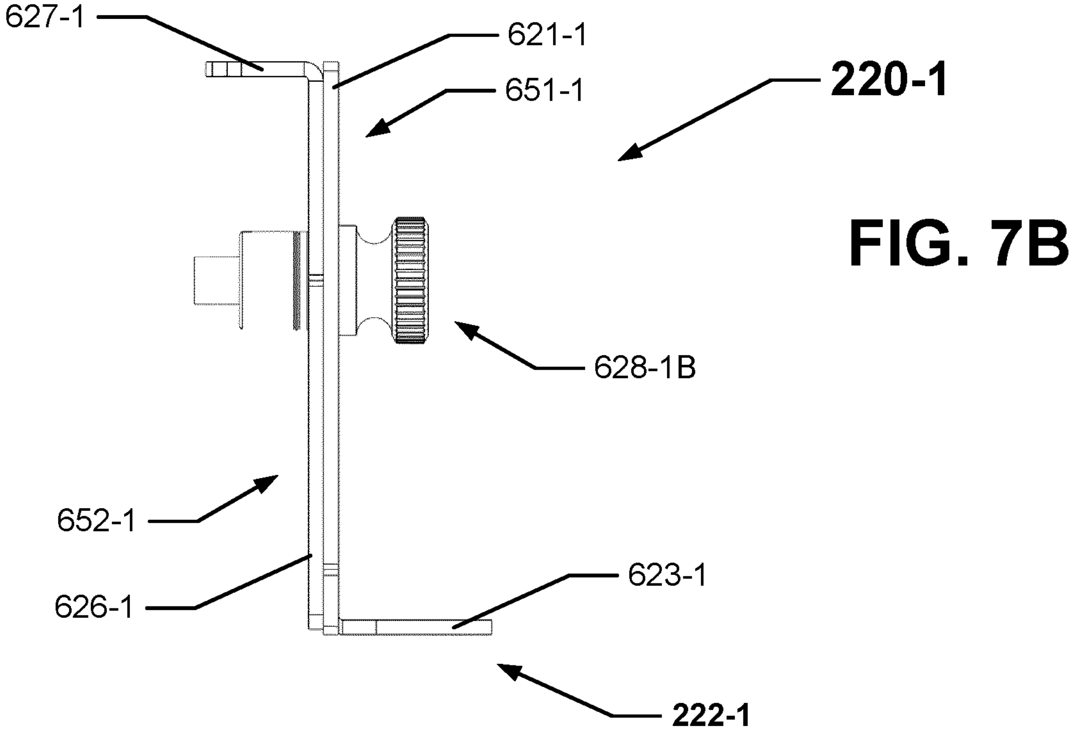
Figure 7C:
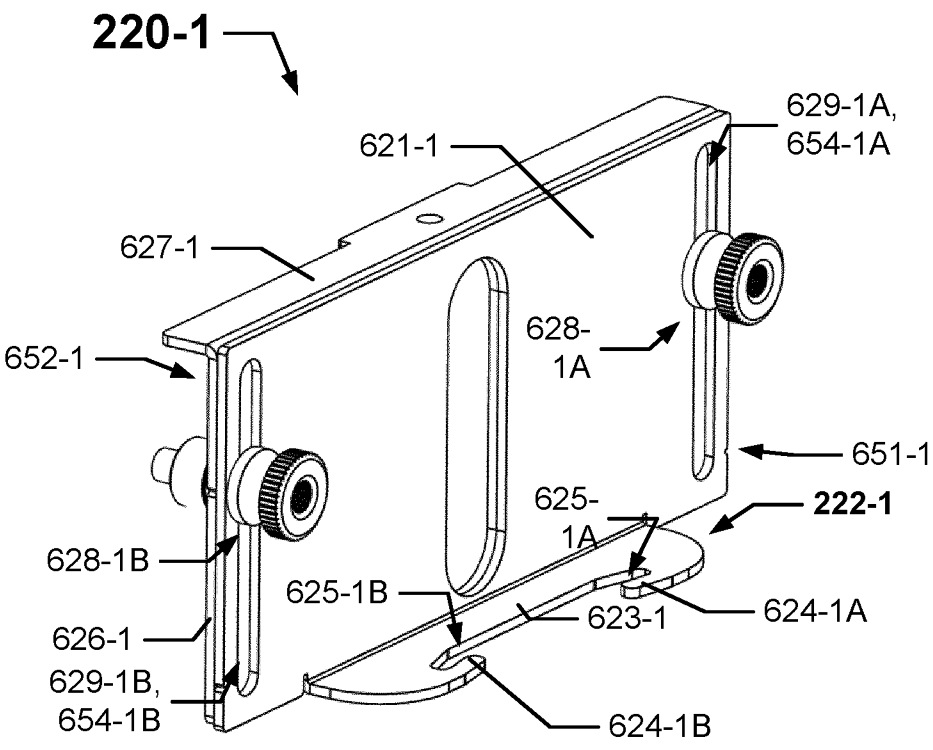

FIGS. 6A through 7C show various views of the torsion spring receiver bracket assembly 220-1 of the recessed luminaire 200 of FIGS. 2A through 2C. FIG. 6A shows a top view of the torsion spring receiver bracket assembly 220-1 in an expanded position. FIG. 6B shows a side view of the torsion spring receiver bracket assembly 220-1 in the expanded position. FIG. 6C shows a perspective view of the torsion spring receiver bracket assembly 220-1 in the expanded position. FIG. 6D shows a front view of the torsion spring receiver bracket assembly 220-1 in the expanded position. FIG. 7A shows a front view of the torsion spring receiver bracket assembly 220-1 in a default (non-expanded) position. FIG. 7B shows a side view of the torsion spring receiver bracket assembly 220-1 in the default position. FIG. 7C shows a perspective view of the torsion spring receiver bracket assembly 220-1 in the default position.

Referring to FIGS. 1 through 7C, the torsion spring receiver bracket assembly 220-1 includes multiple components. For example, in this case, the torsion spring receiver bracket assembly 220-1 includes two pieces (piece 651-1 and piece 652-1) that are movably coupled to each other and a pair of coupling features 628-1 (coupling feature 628-1A and 628-1B). Piece 651-1 in this example has a main wall 621-1 and a torsion spring receiver 222-1 that extends laterally away (in the direction opposite the main wall 626-1 of the piece 652-1) from the bottom of the main wall 621-1. The torsion spring receiver 222-1 has a body 623-1 that terminates distally in two hooked extensions 624-1 (extension 624-1A and extension 624-1B) that form two slots 625-1 (slot 625-1A and slot 625-1B) into which the arms of a spring clip (not shown in FIGS. 6A through 7C, but shown in FIGS. 8 through 10 below) are disposed.

The piece 651-1 also includes two parallel slots 629-1 (slot 629-1A and slot 629-1B) that traverse the thickness of the main wall 621-1. The slots 629-1 are disposed along most of the height of the main wall 621-1, with slot 629-1A running along proximate to one edge (e.g., the right edge) of the main wall 621-1 and slot 629-1B running along the opposite edge (e.g., the left edge) of the main wall 621-1. The characteristics (e.g., height, width, rounded ends) of the slots 629-1 are substantially identical to each other in this example. In alternative embodiments, one or more characteristics of one slot 629-1 (e.g., slot 629-1A) can differ from the corresponding characteristics of the other slot 629-1 (e.g., slot 629-1B). In some alternative embodiments, there can be a single slot or more than 2 slots in the main wall 621-1. The purpose of the slots 629-1 is to allow for vertical movement of the piece 651-1 relative to the piece 652-1 of the torsion spring receiver bracket assembly 220-1, thereby adjusting the vertical position of the torsion spring receiver 222-1. Those of ordinary skill in the art will appreciate that other methods can be used to adjust the vertical position of the torsion spring receiver 222-1 aside from the use of the slots 629-1 in the main wall 621-1.

The piece 652-1 of the torsion spring receiver bracket assembly 220-1 in this example has a main wall 626-1 and an extension 627-1 that extends laterally away (in the direction opposite the main wall 621-1 of the piece 651-1) from the top of the main wall 626-1. The extension 627-1 of the piece 652-1 includes a coupling feature 653-1 (in the form of an aperture in this case) that is configured to couple the torsion spring receiver bracket assembly 220-1, directly or indirectly, to a frame bracket 575 (e.g., frame bracket 575-1) of the frame 105. The characteristics (e.g., size, location) of the coupling feature 653-1 are configured to complement the corresponding characteristics of the complementary coupling feature of the frame bracket 575.

The piece 652-1 also includes two parallel slots 654-1 (slot 654-1A and slot 654-1B) that traverse the thickness of the main wall 626-1. The slots 654-1 are disposed along most of the height of the main wall 626-1, with slot 654-1A running along proximate to one edge (e.g., the right edge) of the main wall 626-1 and slot 654-1B running along the opposite edge (e.g., the left edge) of the main wall 626-1. The characteristics (e.g., height, width, rounded ends) of the slots 654-1 are substantially identical to each other in this example. In alternative embodiments, one or more characteristics of one slot 654-1 (e.g., slot 654-1A) can differ from the corresponding characteristics of the other slot 654-1 (e.g., slot 654-1B). In some alternative embodiments, there can be a single slot or more than 2 slots in the main wall 626-1. The purpose of the slots 654-1 is to allow for vertical movement of the piece 651-1 relative to the piece 652-1 of the torsion spring receiver bracket assembly 220-1, thereby adjusting the vertical position of the torsion spring receiver 222-1. Those of ordinary skill in the art will appreciate that other methods can be used to adjust the vertical position of the torsion spring receiver 222-1 aside from the use of the slots 654-1 in the main wall 626-1.

The slots 629-1 in the main wall 621-1 of the piece 651-1 and the slots 654-1 in the main wall 626-1 of the piece 652-1 are designed to complement each other in adjusting the vertical position of the torsion spring receiver 222-1. Specifically, in this case, regardless of the vertical position of the piece 651-1 relative to the piece 652-1, the slot 629-1A in the main wall 621-1 of the piece 651-1 is horizontally aligned with the slot 654-1A in the main wall 626-1 of the piece 652-1, and simultaneously the slot 629-1B in the main wall 621-1 of the piece 651-1 is horizontally aligned with the slot 654-1B in the main wall 626-1 of the piece 652-1.

In certain example embodiments, the coupling features 628-1, when disposed within the slots 621-1 and the slots 626-1, are used to secure the relative position between the piece 651-1 and the piece 652-1. In this case, the coupling feature 628-1A and the coupling feature 628-1B are configured identically with respect to each other. Specifically, each coupling feature 628-1 is a combination of a screw with a turning knob at its proximal end and a threaded nut through which the distal end of the screw is rotatably disposed. When the turning knob of a coupling feature 628-1 abuts against an outer surface of one of the main walls (e.g., main wall 651-1), with the screw of the coupling feature 628-1 disposed within a slot 629-1 of the main wall 621-1 and a slot 654-1 of the main wall 626-1, and with the threaded nut of the coupling feature 628-1 abutting against the outer surface of the other main wall (e.g., main wall 626-1), a user can tighten the coupling feature 628-1 to maintain a relative position of the piece 651-1 to the piece 652-1 or loosen the coupling feature 628-1 to change the relative position of the piece 651-1 to the piece 652-1.

As mentioned above, those of ordinary skill in the art will appreciate that the torsion spring receiver bracket assembly 220-1 can have any of a number of other configurations to allow for the adjustment of the vertical position of the torsion spring receiver 222-1. For example, the torsion spring receiver bracket assembly 220-1 can be made of a single piece that is vertically extendable. As another example, the torsion spring receiver 222-1 can be a removable piece of the torsion spring receiver bracket assembly 220-1 that can be coupled into any of a number of discrete vertical positions along the main wall. Regardless of the configuration of the torsion spring receiver bracket assembly 220-1, the vertical position of the torsion spring receiver 222-1 can be adjusted so that the arms of a torsion spring 102 disposed in the vertical position of the torsion spring receiver 222-1 can be raised or lowered, as shown in FIGS. 8 and 9 below.

When the recessed luminaire 200 has multiple torsion spring receiver bracket assemblies 220, the configuration and/or characteristics of one torsion spring receiver bracket assembly 220 (e.g., torsion spring receiver bracket assembly 220-1) can be the same as or different than the configuration and/or characteristics of the other torsion spring receiver bracket assemblies 220.

Figure 8:
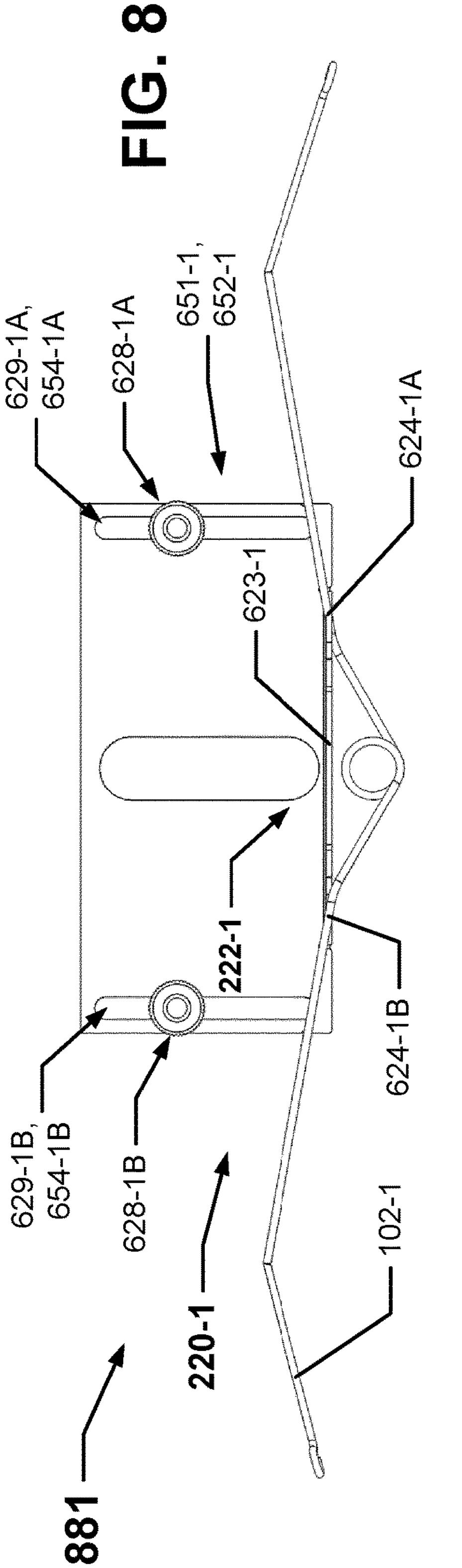
FIGS. 8 and 9 show a subassembly of the recessed luminaire of FIGS. 2A through 2C.
Figure 9:
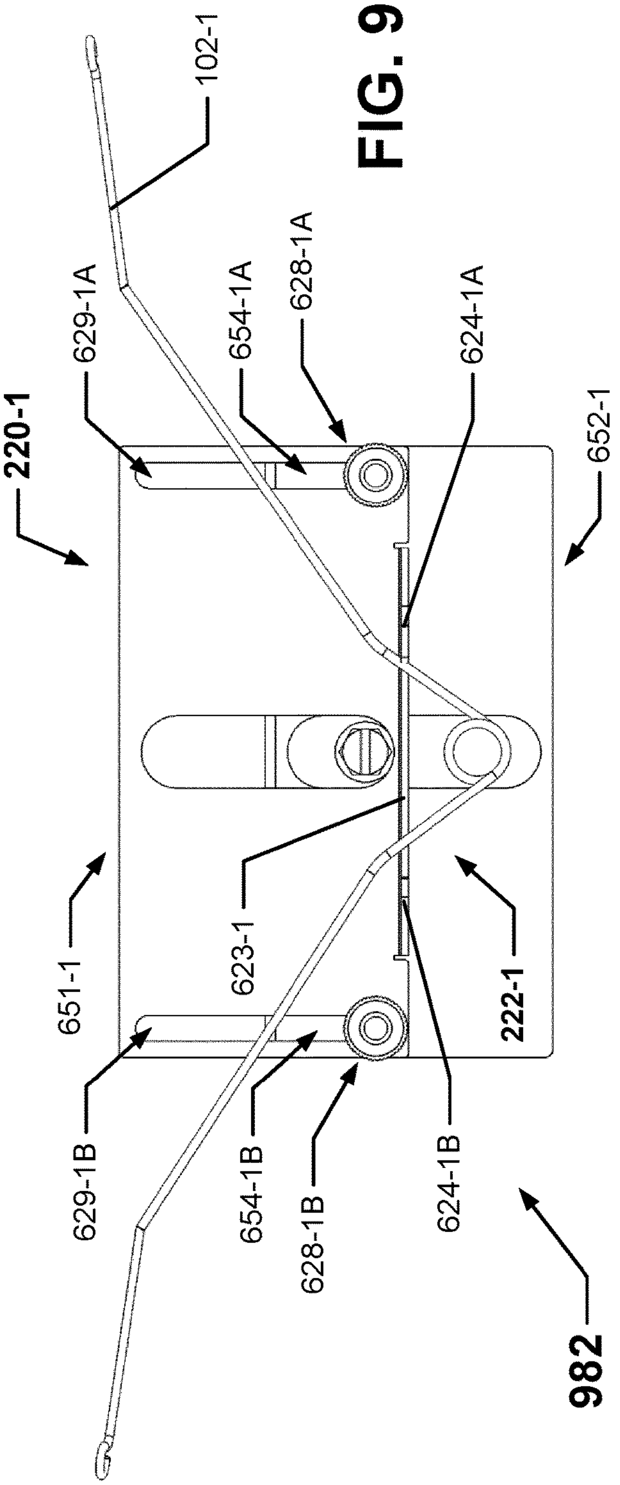

FIGS. 8 and 9 show a subassembly of the recessed luminaire of FIGS. 2A through 2C. Specifically, FIG. 8 shows a front view of a subassembly 881, which includes a torsion spring 102-1 engaged with the torsion spring receiver bracket assembly 220-1 of FIGS. 7A through 7C when the torsion spring receiver bracket assembly 220-1 is in a default position. FIG. 9 shows a front view of a subassembly 982, which includes the torsion spring 102-1 engaged with the torsion spring receiver bracket assembly 220-1 of FIGS. 6A through 6D when the torsion spring receiver bracket assembly 220-1 is in a vertically extended position.

Referring to FIGS. 1 through 9, the subassembly 881 of FIG. 8 shows that the position of the torsion spring receiver 222-1 of the torsion spring receiver bracket assembly 220-1 is relatively close to the wound part of the torsion spring 102-1. As a result, the arms of the torsion spring 102-1, which are secured within the slots formed between the extensions 624-1 and the body 623-1 of the torsion spring receiver 222-1, are relatively parallel with each other. In the default position, the vertical alignment of the slots 629-1A and the slots 654-1A (held in position by coupling feature 628-1A), and the vertical alignment of the slots 629-1B and the slots 654-1B (held in position by coupling feature 628-1B), are substantially total.

The subassembly 982 of FIG. 9 shows that the position of the torsion spring receiver 222-1 of the torsion spring receiver bracket assembly 220-1 is more vertically separated from the wound part of the torsion spring 102-1 relative to what is shown in FIG. 8. As a result, the arms of the torsion spring 102-1, which are secured within the slots formed between the extensions 624-1 and the body 623-1 of the torsion spring receiver 222-1, are relatively more raised compared to what is shown in FIG. 8. In this vertically adjusted position, the vertical alignment of the slots 629-1A and the slots 654-1A (held in position by coupling feature 628-1A), and the vertical alignment of the slots 629-1B and the slots 654-1B (held in position by coupling feature 628-1B), is only about 50%.

Figure 10:
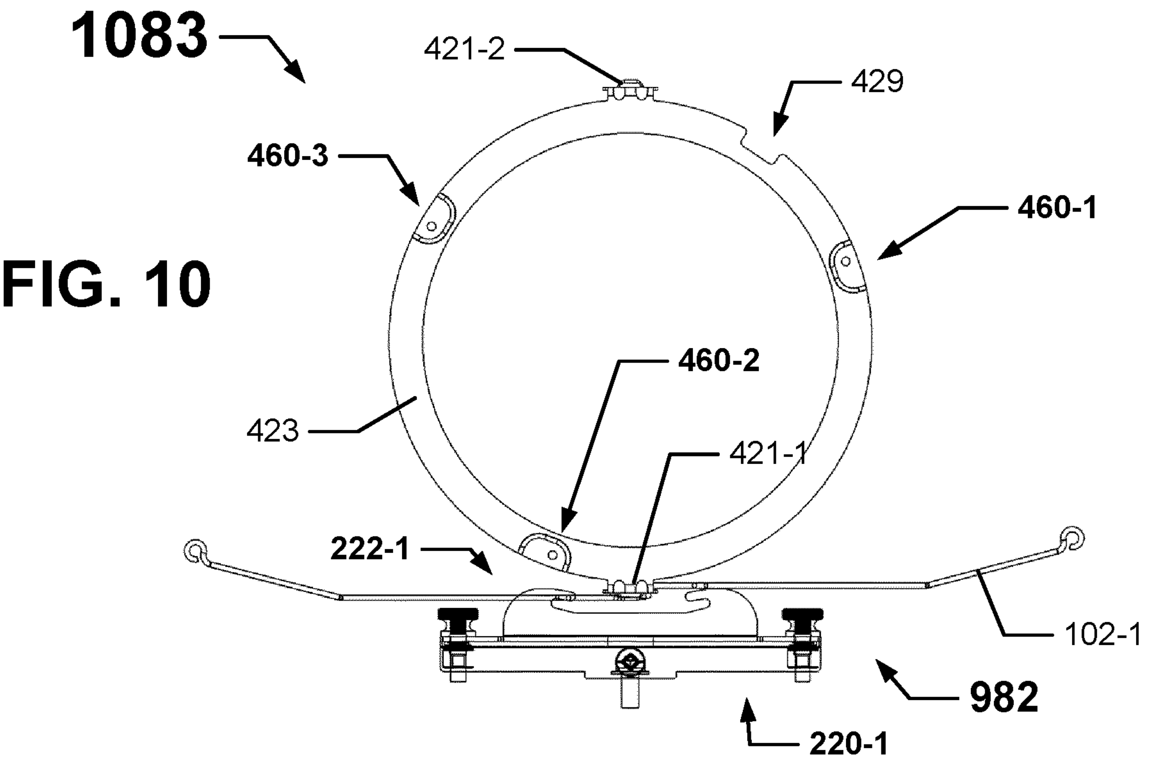
FIG. 10 shows another subassembly of the recessed luminaire of FIGS. 2A through 2C.

FIG. 10 shows a top view of another subassembly 1083 of the recessed luminaire of FIGS. 2A through 2C. Specifically, referring to FIGS. 1 through 10, the subassembly 1083 of FIG. 10 includes the securing assembly flange 423 of FIGS. 4A through 4D combined with the subassembly 982 of FIG. 9. The securing assembly flange 423 includes the three protruding features 460 (protruding feature 460-1, protruding feature 460-2, and protruding feature 460-3), the key receiver 429, and the two torsion spring brackets 421 (torsion spring bracket 421-1 and torsion spring bracket 421-2). The subassembly 982 includes the torsion spring 102-1 and the torsion spring receiver bracket assembly 220-1. This view also shows how the torsion spring receiver 222-1 engages the arms of the torsion spring 102-1 and lifts them higher when the torsion spring receiver bracket assembly 220-1 is in the expanded position.

Figure 11A:
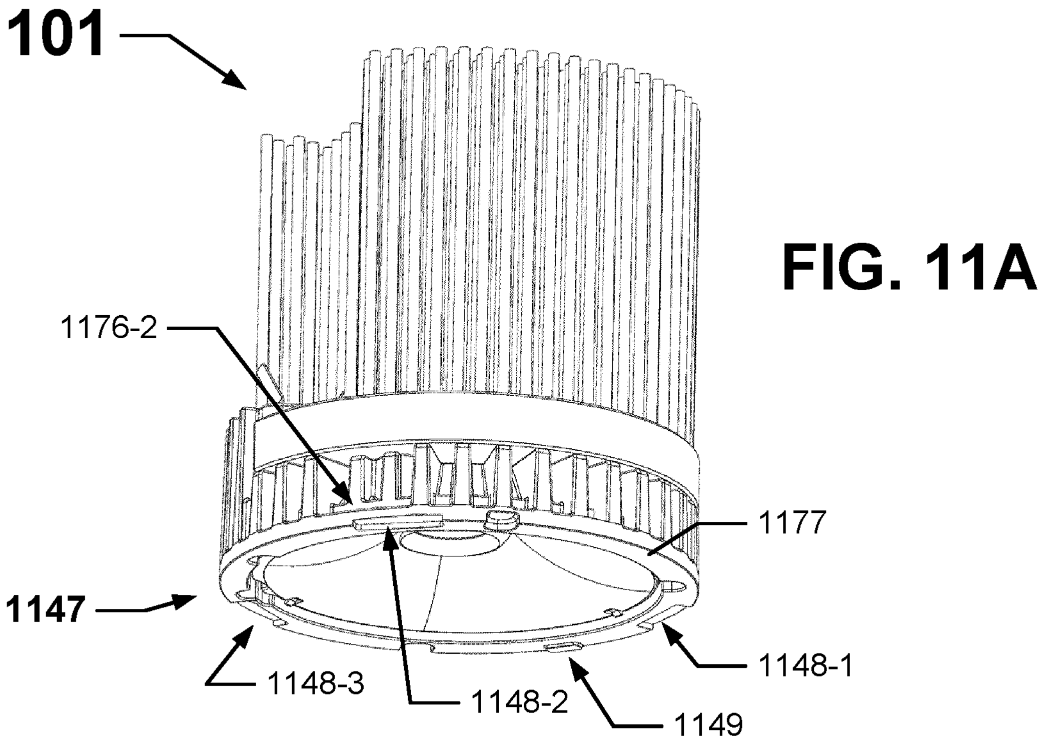
FIGS. 11A through 11C show various views of the heat sink assembly of the recessed luminaire of FIGS. 2A through 2C.
Figure 11B:
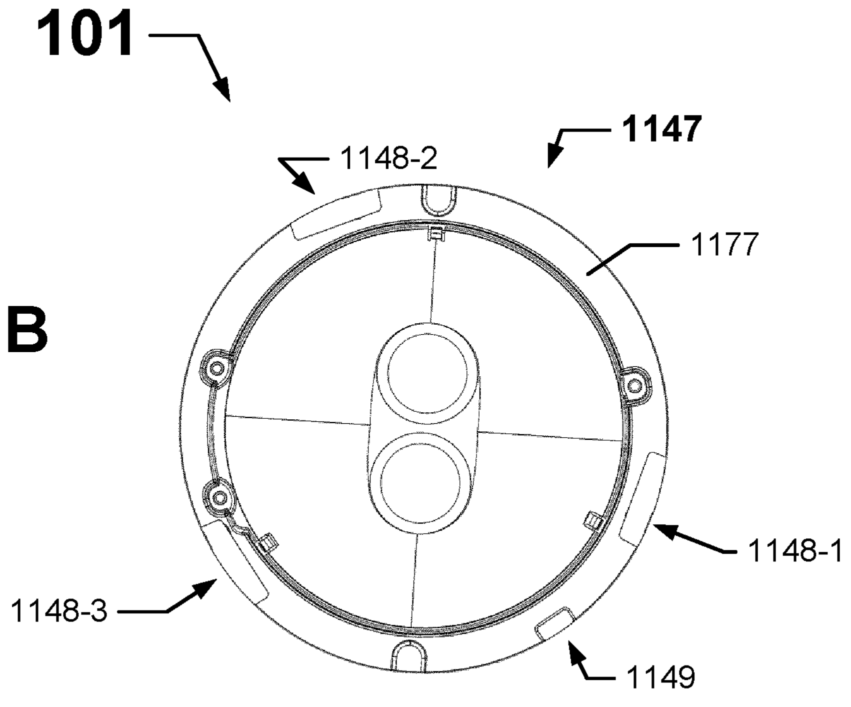
Figure 11C:
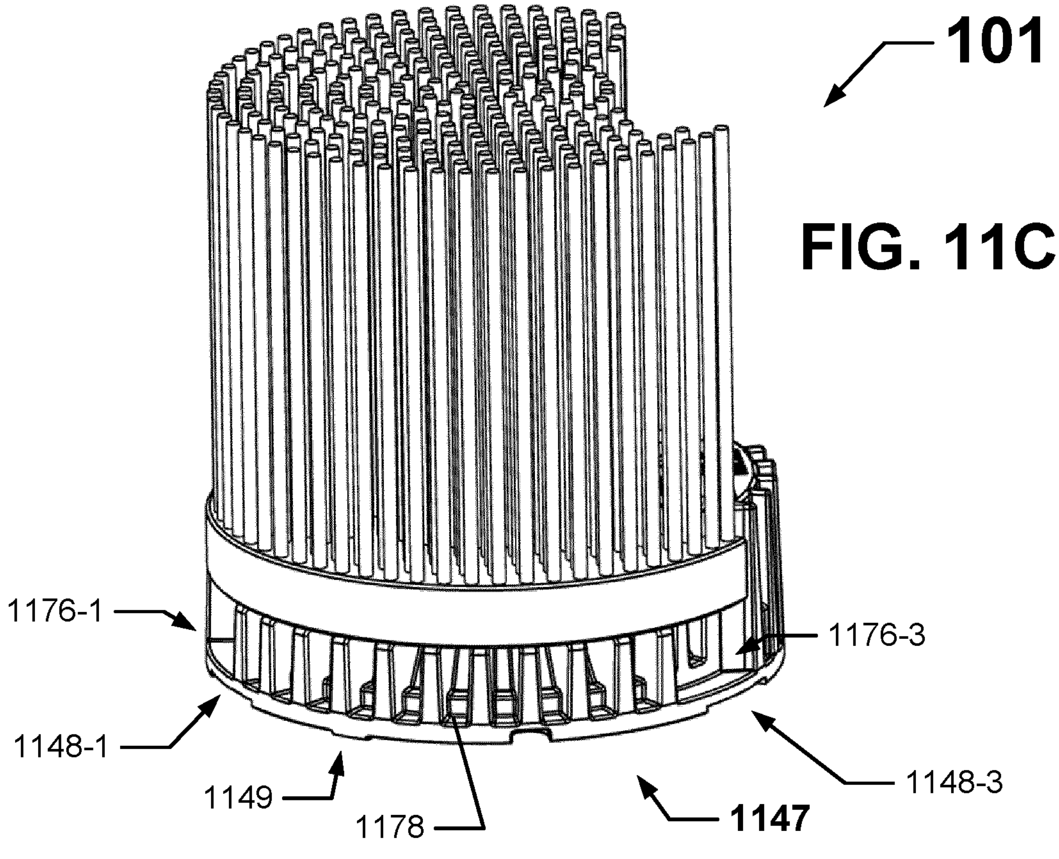

FIGS. 11A through 11C show various views of the heat sink assembly 101 of the recessed luminaire 200 of FIGS. 2A through 2C. Specifically, FIG. 11A shows a bottom perspective view of the heat sink assembly 101. FIG. 11B shows a bottom view of the heat sink assembly 101. FIG. 11C shows a top perspective view of the heat sink assembly 101. Referring to FIGS. 1 through 11C, the heat sink assembly 101 includes a collar 1147 at its bottom end. The collar 1147 of the heat sink assembly 101 includes a number of features. In this case, the bottom surface 1177 of the collar 1147 includes a key 1149 and three recesses 1148 (recess 1148-1, recess 1148-2, and recess 1148-3). Also, the top surface 1178 of the collar 1147 include three recesses 1176 (recess 1176-1, recess 1176-2, and recess 1176-3).

In certain example embodiments, the key 1149 is used to implement a particular orientation between the heat sink assembly 101 and the securing assembly 230 when the key 1149 engages the key receiver 429 of the securing assembly flange 423, as discussed above with respect to FIGS. 4A through 4D and 10. The key 1149 can have any of a number of characteristics (e.g., shape, size). Specifically, the key 1149 is configured to complement the key receiver 429 of the securing assembly flange 423. In this case, the key 1149 is a slight rectangular-shaped (when viewed from below) protrusion from the bottom surface of the collar 1147.

Each recess 1148 in the bottom surface 1177 of the collar 1147 is configured to receive the various components (e.g., the body 461 of the protruding feature 460, the coupling body 466 and the associated coupling feature 467 of a securing member 465, the top of the coupling feature 470) of a securing member assembly 425 of the securing assembly 230, as discussed above with respect to FIGS. 4A through 4D. For example, the recess 1148-1 disposed in the bottom surface 1177 of the collar 1147 is configured to receive the body 461-1 of the protruding feature 460-1 in the securing assembly flange 423, the coupling body 466-1 (including any rotational movement thereof) and the associated coupling feature 467-1 of the securing member 465-1, and the top of the coupling feature 470-1 of the securing member assembly 425-1. The interaction between the recess 1148-2 and the components of the securing member assembly 425-2 and between the recess 1148-3 and the components of the securing member assembly 425-3 similarly applies.

Each recess 1176 in the top surface 1178 of the collar 1147 is configured to receive the various components (e.g., the top wall 469 of the securing member 465) of a securing member assembly 425 of the securing assembly 230, as discussed above with respect to FIGS. 4A through 4D. For example, the recess 1176-1 disposed in the top surface 1178 of the collar 1147 is configured to receive the top wall 469-1 of the securing member 465-1 of the securing member assembly 425-1. The interaction between the recess 1176-2 and the top wall of the securing member of the securing member assembly 425-2 and between the recess 1176-3 and the top wall of the securing member of the securing member assembly 425-3 similarly applies.

The characteristics (e.g., position on the collar 1147, shape, size) of the various features (e.g., the recesses 1148, the recesses 1176, the key 1149) on the collar that are used to allow for vertical alignment of the heat sink assembly 101, the trim assembly 210, and the securing assembly 230 are designed to complement the various complementary features (e.g., the protruding features 460, the coupling features 470, the securing members 465, the key receiver 429) of the securing assembly 230. As the configuration of one or more components of the securing assembly 230 changes, the configurations of the collar 1147 of the heat sink assembly 101 can change accordingly to remain complementary to those changes.

FIGS. 12A and 12B show various views of a portion of the recessed luminaire 200 of FIGS. 2A through 2C. Specifically, FIG. 12A shows a front view of a detail of the recessed luminaire 200 of FIGS. 2A through 2C. FIG. 12B shows a side view of the detail of the recessed luminaire 200 of FIGS. 2A through 2C. Referring to FIGS. 1 through 12B, the detail shown in FIGS. 12A and 12B is of the interaction of the securing member assembly 425-3 of the securing assembly 230 with the trim assembly 210 and the heat sink assembly 101.

In this case, the securing member assembly 425-3 is rotatably coupled to the securing assembly flange 423 using an independent coupling feature 470-3 (in the form of a rivet) that traverses the coupling body 466-3 of the securing member 465-3 and the body 461 of the protruding feature 460-1 of the securing assembly flange 423. In addition to the coupling body 466-3, the securing member 465-3 of the securing assembly 230 includes a top wall 469-3, a bottom wall 468-3, and a rear wall 463-3 disposed therebetween. Within the space formed between the top wall 469-3, the bottom wall 468-3, and the rear wall 463-3 of the securing member 465-3 are the securing assembly flange 423, which is sandwiched between the collar 1147 of heat sink assembly 101 and the trim collar 214 of the trim assembly 210. The top wall 469-3 of the securing member 465-3 abuts against a recess 1176-3 in the top surface 1178 of the collar 1147 of the heat sink assembly 101.

The tab 215-1 disposed on the trim collar 214 and the tab 217-1 disposed on the removable panel 250-1 abut against each other and are set enough of a downward angle that both the tab 215-1 and the tab 217-1 are outside the space between the top wall 469-3, the bottom wall 468-3, and the rear wall 463-3 of the securing member 465-3. Further, the tab 215-1 and the tab 217-1 avoid contact with the bottom wall 468-3 so that, when the trim assembly 210 is rotated relative to the securing assembly 230 and the heat sink assembly 101, the tab 215-1 and the tab 217-1 do not inhibit such rotation of the trim assembly past the securing member 465-3.

In alternative embodiments, rather than having free rotation of the trim assembly in any direction and by any amount with respect to the securing assembly 230 and the heat sink assembly 101, one or more stops can be used or inserted with respect to the trim assembly 210, the securing assembly 230, and/or some other component of the recessed luminaire 200. For example, by reducing the amount of downward bend in the tab 215-1 and/or the tab 217-1, the bottom wall 468-3 of the securing member 465-3 can come into contact with the tab 215-1 and/or the tab 217-1 as the trim assembly 210 rotates with respect to the securing assembly 230 and the heat sink assembly 101. In such a case, the tab 215-1 and/or the tab 217-1 can act as a stop or limit on the range of rotation of the trim assembly 210.

As another example, if the vertical position of a torsion spring receiver 222 of a torsion spring receiver bracket assembly 220 is low enough, thereby lowering the arms of the torsion spring 102 secured by the torsion spring receiver 222, then the arms of the torsion spring 102 can come into contact with a side edge of a removable panel 250 of the trim assembly 210 as the trim assembly 210 is rotated. In this way, a torsion spring 102 can serve as a stop to limit the amount of rotation of the trim assembly 210 to approximately (or slightly less than) 180°.

As yet another example, one or more features (e.g., a detent, a protrusion, an extension) can be added to the bottom surface or the outer edge of the securing assembly flange 423 to interfere with one or more components (e.g., a tab 215, a tab 217) of the trim assembly 210. In this way, there one or more additional features of the securing assembly flange 423 can serve as a stop to limit the range of travel of the trim assembly 210.

Figure 13A:
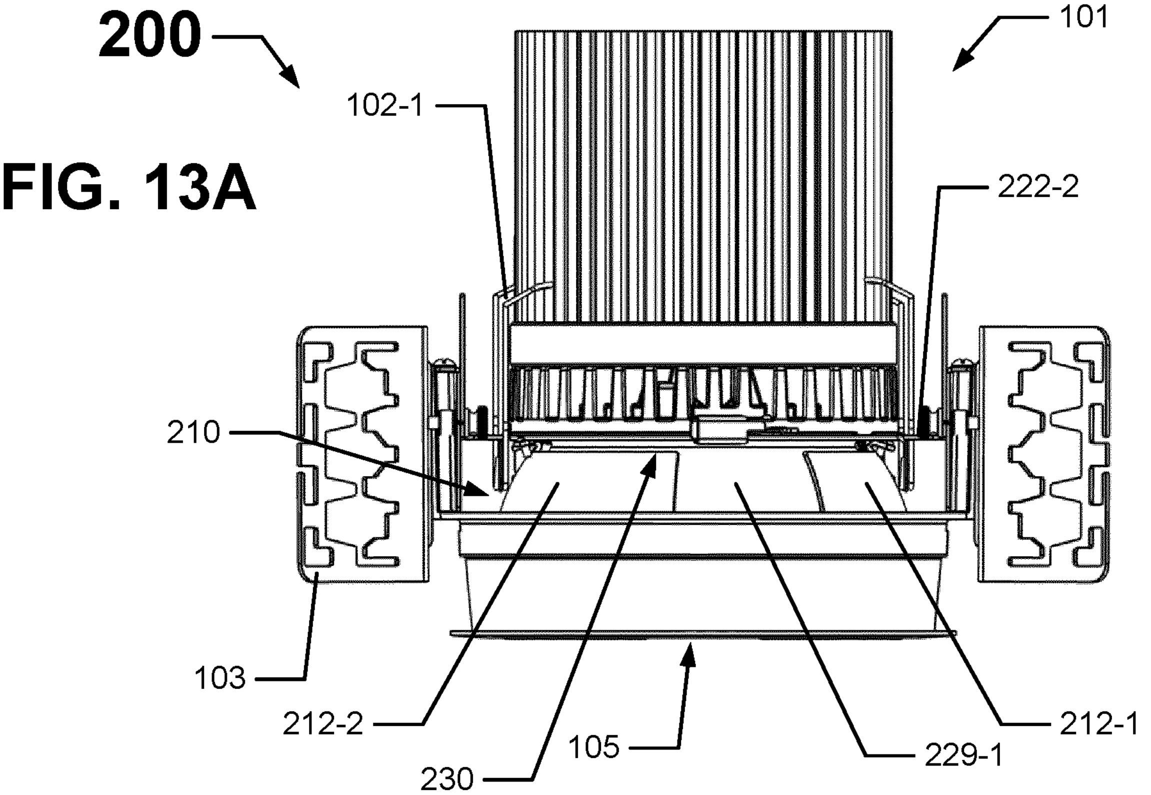
FIGS. 13A and 13B show various views of the recessed luminaire of FIGS. 2A through 2C with the trim assembly rotated.
Figure 13B:
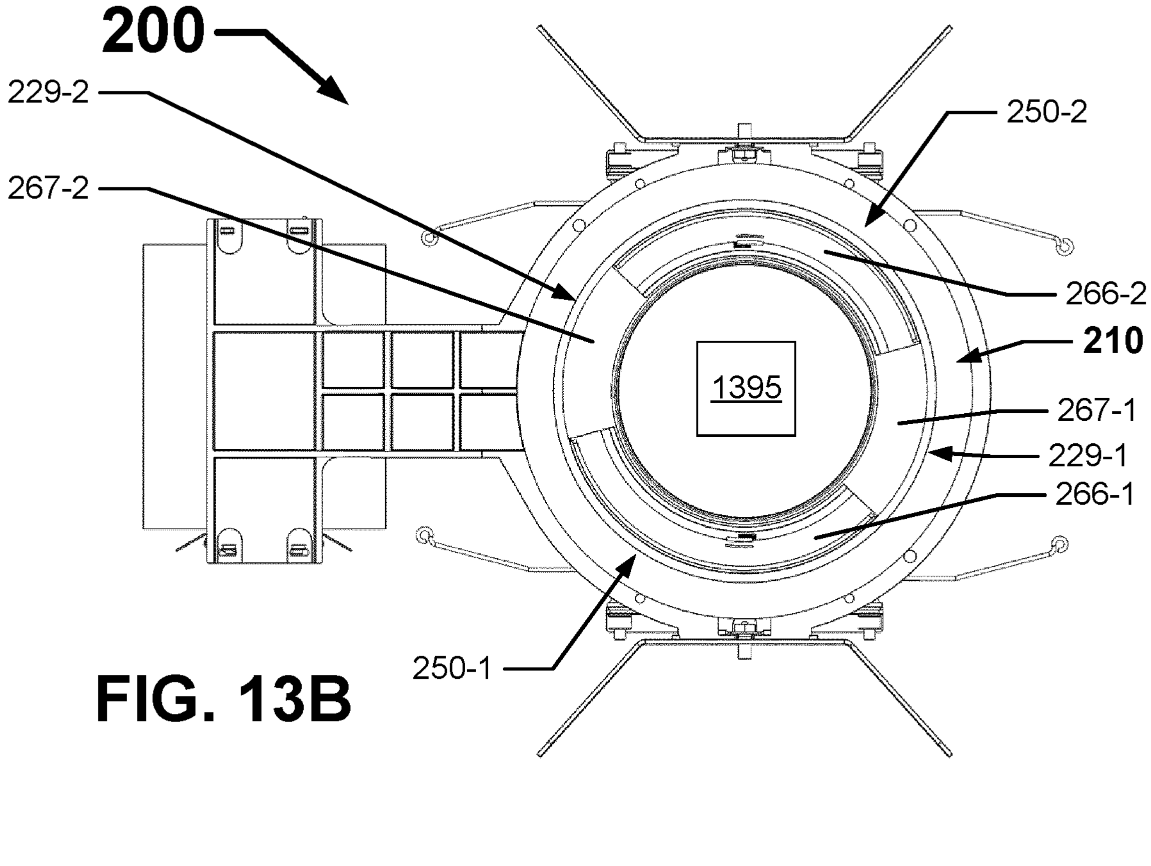

FIGS. 13A and 13B show various views of the recessed luminaire 200 of FIGS. 2A through 2C with the trim assembly 210 rotated. Specifically, FIG. 13A shows a side view of the luminaire 200, and FIG. 13B shows a bottom view of the luminaire 200. Referring to FIGS. 1 through 13B, the recessed luminaire 200 of FIGS. 13A and 13B is identical to the recessed luminaire 200 of FIGS. 2A through 2C, except that the trim assembly 210 in FIGS. 13A and 13B is rotated 90° counterclockwise when viewed from below.

The bottom view of the recessed luminaire 200 shown in FIG. 13B reveals multiple light sources 1395 located at the top and within the center of the opening of the trim assembly 210. FIG. 13B also shows the inner surface 266-1 of the removable panel 250-1, the inner surface 266-2 of the removable panel 250-2, the inner surface 267-1 of the trim side wall section 229-1, and the inner surface 267-2 of the trim side wall section 229-2. As discussed above, in certain example embodiments, the inner surfaces 267 of the sections of the trim side walls 229 can have different optical properties (e.g., coating material, radius of curvature) compared to the inner surfaces 266 of the removable panels 250. As a result, the light emitted by the light sources 1395 of the recessed luminaire 200 can have a non-uniform light dispersion. As a result, the orientation of the trim assembly 210 can be important to have a desired or optimal light distribution into a volume of space. Examples of such light dispersion are shown below with respect to FIGS. 15 and 16.

Figure 14:
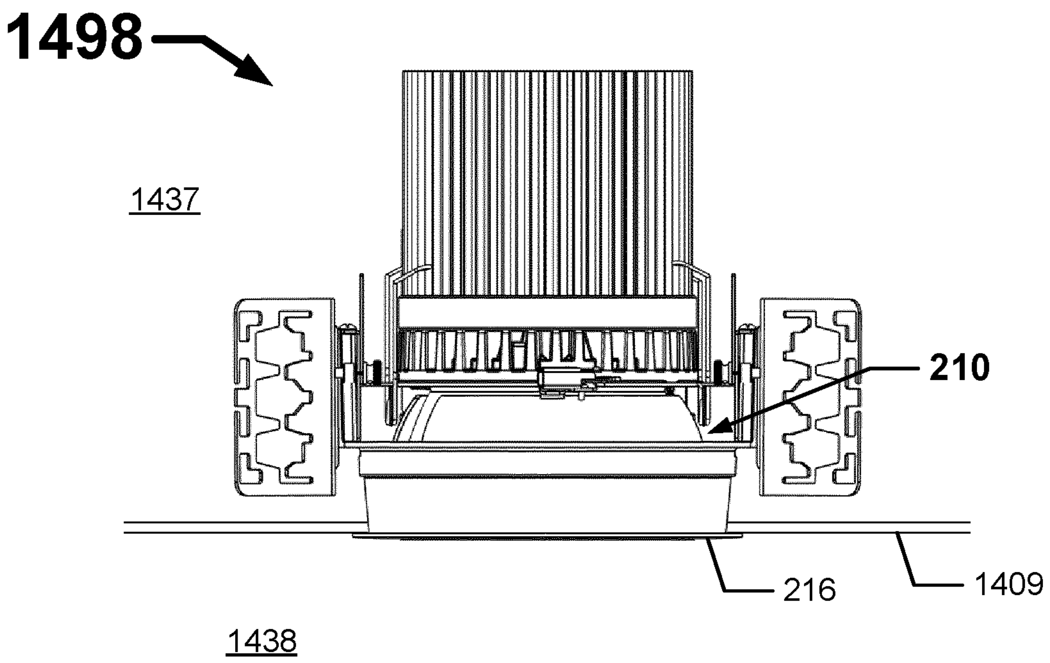
FIG. 14 shows a side view of a system that includes the recessed luminaire of FIGS. 2A through 2C after installation.

FIG. 14 shows a side view of a system 1498 that includes the recessed luminaire 200 of FIGS. 2A through 2C after installation. Referring to FIGS. 1 through 14, the recessed luminaire 200 is installed in a ceiling 1409 (e.g., drywall, ceiling tile). The bottom surface of the trim collar 216 of the trim assembly 210 is exposed to the volume of space 1438 below the ceiling 1409 that is illuminated by the recessed luminaire 200. The remainder of the recessed luminaire 200 is disposed in the plenum space 1437 located above the ceiling 1409. Since most of the recessed luminaire 200 is located in the plenum space 1437, when the light emitted by the recessed luminaire 200 is distributed in a non-uniform pattern into the volume of space 1438, an inability to rotate the trim assembly 210 of the recessed luminaire 200 in order to have a desired light distributed pattern after installation, which is an issue with recessed luminaires currently used in the art, can be destructive to the ceiling 1409 and even the recessed luminaire 200. By contrast, the example recessed luminaire 200 allows a user to rotate the trim assembly 210 without the use of tools and without having to uninstall/reinstall the recessed luminaire 200 from the ceiling 1409.

Figure 15:
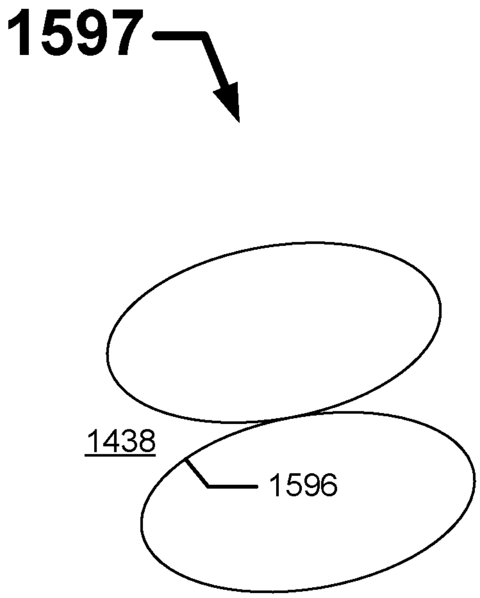
FIG. 15 shows a graph of a light dispersion pattern of light output by the recessed luminaire of FIGS. 2A through 2C.

FIG. 15 shows a graph 1597 of a light dispersion pattern 1596 of light output by the recessed luminaire 200 of FIGS. 2A through 2C. Referring to FIGS. 1 through 15, the light dispersion pattern 1596 of FIG. 15 of the recessed luminaire 200 corresponds to the trim assembly 210 having a position as shown in FIGS. 2A through 2C. Specifically, in this case, the removable panels 250 of the trim assembly 210 drive the focus of the light dispersion pattern 1596. In certain environments (e.g., a hallway, an office space), it may be desirable to have the light dispersed differently from what is shown in FIG. 15. For example, if the recessed luminaire 200 is located in a hallway, it may be more desirable to have a wall wash, where most of the light emitted by the recessed luminaire 200 is directed to the walls that form the hallway. In such a case, the trim assembly 210 of the recessed luminaire 200 needs to be rotated by approximately 90° if the walls of the hallway are on the left and right sides in the volume of space 1438.*g*

Figure 16:
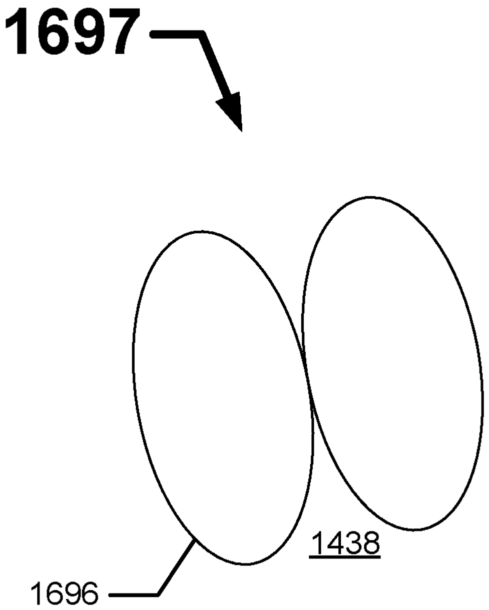
FIG. 16 shows a graph of a light dispersion pattern of light output by the recessed luminaire of FIGS. 13A and 13B.

FIG. 16 shows a graph 1697 of a light dispersion pattern 1696 of light output by the recessed luminaire 200 of FIGS. 13A and 13B. Referring to FIGS. 1 through 16, the light dispersion pattern 1696 of FIG. 16 of the recessed luminaire 200 corresponds to the trim assembly 210 having a position as shown in FIGS. 13A and 13B. Specifically, in this case, the trim assembly 210 in this case is rotated approximately 90° drive the focus of the light dispersion pattern 1696 predominantly to the left and right sides in the volume of space 1438.

Example embodiments can be used to allow a trim assembly of a recessed luminaire to be rotated by a user without the use of a tool (e.g., a screwdriver, a wrench), even if the recessed luminaire is installed (e.g., in a ceiling). By rotating the trim assembly, the light that is distributed in a non-uniform pattern can be directed to a desired location within a volume of space. Example embodiments can also provide flexibility as to how light emitted by the recessed luminaire can be distributed. For instance, by changing out one or more removable panels of the example trim assembly, where the inner surface of the removable panels has different optical characteristics, the distribution of light emitted by the recessed luminaire can be changed, regardless of whether the example trim assembly is rotated. Example embodiments can be used with recessed luminaires having any of a number of mounting systems and features. Example embodiments can be used in new installations of luminaires as well as retrofitting or replacing the trim assembly used for existing luminaires. Example embodiments also provide a number of other benefits. Such other benefits can include, but are not limited to, increased ease of maintenance, greater ease of use, and compliance with industry standards that apply to luminaires.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. A recessed luminaire comprising:

a securing assembly comprising a securing assembly flange and a plurality of securing member assemblies disposed on the securing assembly flange, wherein each of the plurality of securing member assemblies is rotatably coupled to the securing assembly flange and secures a collar of a heat sink assembly against the securing assembly flange in a fixed position, wherein the securing assemblies includes at least one torsion spring for connecting to at least one torsion spring receiver bracket located on a torsion spring receiver bracket assembly, wherein a height of the at least one torsion spring receiver bracket on the torsion spring receiver bracket assembly is adjustable, and wherein the securing assembly flange comprises a plurality of receiving features that are raised relative to a remainder of the securing assembly flange, wherein the plurality of receiving features receive a plurality of coupling features of the plurality of securing member assemblies, wherein a portion of each of the plurality of coupling features is disposed within a space created by each of the plurality of receiving features between the plurality of receiving features and the trim flange;

a trim assembly comprising a trim body having a trim flange fixedly disposed atop a trim side wall, wherein the trim flange is secured by the plurality of securing member assemblies, wherein the trim assembly houses at least one removable panel; and after the recessed luminaire is installed in a ceiling, the torsion spring receiver bracket assembly is capable of raising the height of the torsion spring receiver bracket allowing the trim assembly to be rotatable, where a rotation of the trim assembly moves the at least one removable panel from a first orientation to a second orientation.

2. The luminaire of claim 1, wherein the at least one removable panel is disposed in at least one opening in the trim side wall.

3. The luminaire of claim 1, wherein the at least one removable panel comprises an inner surface that directs light emitted by a light source to provide lighting to a portion of a volume of space.

4. The luminaire of claim 1, wherein the at least one removable panel comprises a first removable panel and a second removable panel.

5. The luminaire of claim 1, wherein the trim assembly has a limited range of rotation.

6. The luminaire of claim 1, wherein each of the at least one torsion spring receiver brackets is C-shaped.

7. The luminaire of claim 1, wherein each of the at least one torsion spring receiver bracket assemblies comprises multiple pieces that are slidably coupled to each other.

8. The luminaire of claim 7, wherein each of the plurality of torsion spring receiver bracket assemblies further comprises at least one fastening feature that secures the multiple pieces in place with respect to each other.

9. The luminaire of claim 1, further comprising:

a frame comprising a frame wall and a plurality of frame brackets, wherein the frame wall is disposed around the trim assembly below the trim flange, and wherein the plurality of torsion spring receiver bracket assemblies is coupled to the plurality of frame brackets.

10. The luminaire of claim 1, wherein the securing assembly flange of the securing assembly comprises a key receiver for receiving a key disposed in the collar of the heat sink assembly.

* * * * *